US008556089B2

(12) United States Patent
Kalayci et al.

(10) Patent No.: US 8,556,089 B2
(45) Date of Patent: Oct. 15, 2013

(54) SUPER ABSORBENT CONTAINING WEB THAT CAN ACT AS A FILTER, ABSORBENT, REACTIVE LAYER OR FUEL FUSE

(75) Inventors: Veli E. Kalayci, Farmington, MN (US); James Doyle, St. Louis Park, MN (US); Derek O. Jones, Andover, MN (US); Brian Babcock, Bloomington, MN (US); Michael J. Hebert, St. Paul, MN (US); Philip E. Johnson, Apple Valley, MN (US); Ketan C. Mehta, Apple Valley, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 13/563,909

(22) Filed: Aug. 1, 2012

(65) Prior Publication Data

US 2012/0312734 A1    Dec. 13, 2012

Related U.S. Application Data

(62) Division of application No. 13/026,566, filed on Feb. 14, 2011, now Pat. No. 8,263,214, which is a division of application No. 12/047,626, filed on Mar. 13, 2008, now Pat. No. 7,988,860.

(60) Provisional application No. 60/918,456, filed on Mar. 15, 2007.

(51) Int. Cl.
*B01D 24/00* (2006.01)

(52) U.S. Cl.
USPC .......................................... 210/503; 210/505

(58) Field of Classification Search
USPC .................................................. 210/503, 505
See application file for complete search history.

(56) References Cited

U.S. PATENT DOCUMENTS

| 3,019,127 A | 1/1962 | Czerwonka et al. |
| 3,676,242 A | 7/1972 | Prentice |

(Continued)

FOREIGN PATENT DOCUMENTS

| DE | 202005020566 | 5/2006 |
| EP | 0268498 | 5/1988 |

(Continued)

OTHER PUBLICATIONS

Ko, F et al., "Electrospinning of Continuous Carbon Nanotube-Filled Nanofiber Yarns", Adv. Mater, vol. 15, No. 14, pp. 1161-1165 (Jul. 17, 2003).

(Continued)

*Primary Examiner* — Chester Barry
(74) *Attorney, Agent, or Firm* — Pauly, DeVries, Smith & Deffner, L.L.C.

(57) ABSTRACT

The web of the invention can comprise a super absorbent layer that can act as an moisture sensitive fuel shut-off valve, absorbent, adsorbant or reactant. The web of the invention can comprise a super absorbent fabric or layer made of a super-absorbent particle or fiber. Fluid, gas or liquid, that flows through or by the assemblies of the invention can have any gas, liquid or solid material dispersed or dissolved in the fluid interact with the super absorbent particulate. The structures of the invention can act simply as flow-by reactive, absorptive, or adsorptive layers with no filtration properties, or the structures of the invention can be assembled into filters.

25 Claims, 10 Drawing Sheets

(56) References Cited

U.S. PATENT DOCUMENTS

| | | |
|---|---|---|
| 3,826,067 A | 7/1974 | Wilder et al. |
| 3,841,953 A | 10/1974 | Lohkamp et al. |
| 3,849,241 A | 11/1974 | Butin et al. |
| 3,878,014 A | 4/1975 | Melead |
| 3,900,648 A | 8/1975 | Smith |
| 3,971,373 A | 7/1976 | Braun |
| 4,100,324 A | 7/1978 | Anderson et al. |
| 4,227,904 A | 10/1980 | Kasmark, Jr. et al. |
| 4,429,001 A * | 1/1984 | Kolpin et al. .......... 442/340 |
| 4,443,515 A | 4/1984 | Atlas |
| 4,460,642 A | 7/1984 | Errede et al. |
| 4,650,506 A | 3/1987 | Barris et al. |
| 4,724,114 A | 2/1988 | McFarland et al. |
| 4,753,730 A | 6/1988 | Maurer |
| 4,765,812 A | 8/1988 | Homonoff et al. |
| 4,820,577 A | 4/1989 | Morman et al. |
| 4,910,064 A | 3/1990 | Sabee |
| 4,963,638 A | 10/1990 | Pazos et al. |
| 5,002,814 A | 3/1991 | Knack et al. |
| 5,082,476 A | 1/1992 | Kahlbaugh et al. |
| 5,135,792 A | 8/1992 | Hogan |
| 5,175,046 A | 12/1992 | Nguyen |
| 5,238,474 A | 8/1993 | Kahlbaugh et al. |
| 5,328,758 A | 7/1994 | Markell et al. |
| 5,332,426 A | 7/1994 | Tang et al. |
| 5,342,418 A | 8/1994 | Jesse |
| 5,344,698 A | 9/1994 | Rock et al. |
| 5,364,456 A | 11/1994 | Kahlbaugh et al. |
| 5,423,892 A | 6/1995 | Kahlbaugh et al. |
| 5,466,733 A | 11/1995 | Hoeks et al. |
| 5,478,466 A | 12/1995 | Heilmann et al. |
| 5,486,410 A | 1/1996 | Groeger et al. |
| 5,607,490 A | 3/1997 | Taniguchi et al. |
| 5,607,550 A | 3/1997 | Akers |
| 5,614,283 A | 3/1997 | Potnis et al. |
| 5,638,569 A | 6/1997 | Newell |
| 5,652,048 A | 7/1997 | Haynes et al. |
| 5,672,399 A | 9/1997 | Kahlbaugh et al. |
| 5,681,469 A | 10/1997 | Barboza et al. |
| 5,750,585 A | 5/1998 | Park et al. |
| 5,797,347 A | 8/1998 | Ochi |
| 5,824,328 A | 10/1998 | Levy |
| 5,836,929 A | 11/1998 | Bewick-Sonntag et al. |
| 5,885,696 A | 3/1999 | Groeger |
| 5,939,086 A | 8/1999 | Levy |
| 5,952,092 A | 9/1999 | Groeger et al. |
| 5,965,091 A | 10/1999 | Navarre et al. |
| 5,972,808 A | 10/1999 | Groeger et al. |
| 5,993,905 A | 11/1999 | Sheehan |
| 5,997,791 A | 12/1999 | Chou et al. |
| 5,998,032 A | 12/1999 | Hansen et al. |
| 6,046,377 A | 4/2000 | Huntoon et al. |
| 6,150,495 A | 11/2000 | Chou et al. |
| 6,187,828 B1 | 2/2001 | Woodrum et al. |
| 6,194,630 B1 | 2/2001 | Chihani et al. |
| 6,319,558 B1 | 11/2001 | Willemsen |
| 6,323,252 B1 | 11/2001 | Gartner et al. |
| 6,342,298 B1 | 1/2002 | Evans et al. |
| 6,353,148 B1 | 3/2002 | Gross |
| 6,371,977 B1 | 4/2002 | Bumbarger et al. |
| 6,403,674 B1 | 6/2002 | Schubert |
| 6,416,697 B1 | 7/2002 | Venturino et al. |
| 6,433,058 B1 | 8/2002 | Weir et al. |
| 6,514,306 B1 | 2/2003 | Rohrbach et al. |
| 6,550,622 B2 * | 4/2003 | Koslow .......... 210/490 |
| 6,646,179 B1 | 11/2003 | Melius et al. |
| 6,743,273 B2 | 6/2004 | Chung et al. |
| 7,033,493 B2 | 4/2006 | McGarvey et al. |
| 7,163,349 B2 | 1/2007 | Policicchio et al. |
| 7,182,537 B2 | 2/2007 | Policicchio et al. |
| 7,267,789 B2 | 9/2007 | Chhabra et al. |
| 7,314,497 B2 | 1/2008 | Kahlbaugh et al. |
| 7,717,975 B2 | 5/2010 | Kalayci et al. |
| 7,988,860 B2 | 8/2011 | Kalayci et al. |
| 8,263,214 B2 | 9/2012 | Kalayci et al. |
| 2003/0099576 A1 | 5/2003 | Li et al. |
| 2003/0211069 A1 | 11/2003 | Deckner et al. |
| 2005/0020170 A1 * | 1/2005 | Deka et al. .......... 442/327 |
| 2005/0215965 A1 | 9/2005 | Schmidt et al. |
| 2005/0266760 A1 | 12/2005 | Chhabra et al. |
| 2006/0004336 A1 | 1/2006 | Zhang et al. |
| 2006/0160452 A1 | 7/2006 | Mirle et al. |
| 2006/0246798 A1 | 11/2006 | Reneker et al. |
| 2007/0021569 A1 | 1/2007 | Willis et al. |
| 2007/0062855 A1 | 3/2007 | Chase et al. |
| 2007/0210008 A1 | 9/2007 | Sprenger et al. |
| 2011/0138685 A1 | 6/2011 | Kalayci et al. |

FOREIGN PATENT DOCUMENTS

| | | |
|---|---|---|
| EP | 0437816 | 7/1991 |
| JP | 89104829 | 4/1989 |
| JP | 07265640 | 10/1995 |
| JP | 10165731 | 6/1998 |
| WO | WO03013732 | 2/2003 |
| WO | WO03080905 | 10/2003 |
| WO | WO2005005696 | 1/2005 |
| WO | WO2005005704 | 1/2005 |
| WO | WO2005061779 | 7/2005 |
| WO | WO2006049664 | 5/2006 |
| WO | WO2006084106 | 8/2006 |
| WO | WO2007016970 | 2/2007 |
| WO | WO2007054039 | 5/2007 |
| WO | WO2007054040 | 5/2007 |
| WO | WO2007092303 | 8/2007 |
| WO | WO2007095335 | 8/2007 |

OTHER PUBLICATIONS

Frautmann, P. et al., "High Performance Nanofibre Coated Filter Media for Engne Intake Air Filtration", Filtration, vol. 6, No. 1, pp. 53-56 (2006).

"International Search Report and Written Opinion", from International Application No. PCT/US2008/057086, mailed Oct. 7, 2008, pp. 1-10.

"Migration of Superabsorbent Polymer (SAP) Media Downsteam of Filtration", Velcon Filters, Inc. Service Bulletin, May 2007, http://www.velcon.com/doc/Vol16-No1-05.21.07.pdf.

"Non-Final Office Action Received", mailed Dec. 6, 2011 in co-pending U.S. Appl. No. 13/026,566, "Super Absorbent Containing Web That Can Act as a Filter, Absorbent, Reactive Layer or Fuel Fuse," (11 Pages).

"Notice of Allowance", mailed Mar. 23, 2011 in co-pending U.S. Appl. No. 12/047,626, "Super Absorbent Containing Web That Can Act as a Filter, Absorbent, Reactive Layer or Fuel," (7 pages).

"Notice of Allowance Received", mailed May 11, 2012 in U.S. Appl. No. 13/026,566, "Super Absorbent Containing Web That Can Act as a Filter, Absorbent, Reactive Layer or Fuel Fuse," (5 pages), (2012).

Hansen, L et al., "Water Absorption and Mechanical Properties of Electrospun Structured Hydrogels", Journal of Applied Polymer Science, vol. 95, pp. 427-434, (2005).

* cited by examiner

SUPER ABSORBENT CONTAINING WEB THAT CAN ACT AS A FILTER, ABSORBENT, REACTIVE LAYER OR FUEL FUSE

CROSS-REFERENCE TO RELATED APPLICATION(S)

This application is a divisional application of U.S. application Ser. No. 13/026,566, filed Feb. 14, 2011, which issued as U.S. Patent No. 8,263,214 on Sep. 11, 2012, which is a divisional application of U.S. application Ser. No. 12/047,626, filed Mar. 13, 2008, which issued as U.S. Pat. No. 7,988,860 on Aug. 2, 2011, which claims the benefit of U.S. Provisional Patent Application 60/918,456, filed Mar. 15, 2007, which applications are hereby incorporated by reference in their entirety.

FIELD OF THE INVENTION

The invention relates to a web or fiber structure with super absorbent properties. The web, filter, element or medium structures of the invention can also act as a reactive, adsorptive or absorptive layer or in a filtration mode. The structure comprises a fiber web and super absorbent particulate, fiber, fabric or layer. The web can also comprise a reactive, adsorptive or absorptive particulate that also acts as an active particulate, active material fiber, spacer or separation means. The webs of the invention can be used in a number of applications and methods including absorptive, filtration or separation methods.

BACKGROUND OF THE INVENTION

Polymer webs can be made by extrusion, melt spinning, air laid and wet laid processing, etc. The manufacturing technology of web structures is vast for obtaining structures that can separate an unwanted, entrained particulate load from a mobile fluid stream. Such materials include filters and separation structures. Filter structures include surface loading media and depth media in which these media can be produced in a variety of geometric structures. Principles relating to the use of such media are described in Kahlbaugh et al., U.S. Pat. Nos. 5,082,476; 5,238,474; 5,364,456 and 5,672,399. In any filter structure containing any arbitrarily selected filtration medium, the filter must remove a defined particle size, and at the same time, have sufficient lifetime to be economically justifiable in its particulate removing properties. Lifetime is generally considered to be the time between installation and the time a filter obtains sufficient particulate load such that the pressure drop across the filter is greater than a predetermined level. An increased pressure drop can cause filter bypass, mechanical filter failure, fluid starvation, or other operating problems. Filtration efficiency is the characteristic of the filtration media that is related to the fraction of the particulate removed from the mobile stream. Efficiency is typically measured by a set test protocol defined below.

Surface loading filter media often comprise dense mats of fiber having a non-woven structure that is placed across the path of a mobile fluid stream. While the mobile fluid stream passes through the structure of the formed non-woven fibers, the particulate is typically removed from the stream at the filter surface with a certain efficiency and remains on the surface. In contrast to surface loading structures, depth media typically include a relatively (compared to surface loading media) thick structure of fiber having a defined solidity, porosity, layer thickness and efficiency. Depth media and in particular, gradient density depth media are shown in Kahlbaugh et al., U.S. Pat. Nos. 5,082,476; 5,238,474 and 5,364,456. In general, depth media act in filtration operations by impeding the particulate loading in a mobile fluid stream within the filter layer. As the particulates impinge the depth media fibrous structure, the particulate remains within the depth media and is typically distributed onto and held with internal fibers and throughout the filter volume. In contrast, surface loading media typically accumulate particulate in a surface layer.

Groeger et al., U.S. Pat. No. 5,486,410, teach a fibrous structure typically made from a bicomponent, core/shell fiber, containing a particulate material. The particulate comprising an immobilized functional material held in the fiber structure. The functional material is designed to interact with and modify the fluid stream. Typical materials include silica, zeolite, alumina, molecular sieves, etc. that can either react with, or absorb materials, in the fluid stream. Markell et al., U.S. Pat. No. 5,328,758, use a melt blown thermoplastic web and a sorbative material in the web for separation processing. Errede et al., U.S. Pat. No. 4,460,642, teach a composite sheet of PTFE that is water swellable and contains hydrophilic absorptive particles. This sheet is useful as a wound dressing, as a material for absorbing and removing non-aqueous solvents, or as a separation chromatographic material. Kolpin et al., U.S. Pat. No. 4,429,001, teach a sorbent sheet comprising a melt blown fiber containing super absorbent polymer particles. Deodorizing or air purifying filters are shown in, for example, Mitsutoshi et al., JP 7265640 and Eiichiro et al., JP 10165731.

Many mobile fluid phases, including both gas and liquid phases, contain undesirable components suspended, dissolved, or otherwise entrained within the mobile phase. Such undesirable components may be chemically reactive or may be absorbable or absorbable through the use of absorbents or adsorbents. Absorbents and Super absorbents are characterized by the degree of absorption. Often these species form a phase that is fully miscible in the fluid and cannot be filtered, but can be removed only by chemical reaction absorbents or adsorbents. Examples of materials to be absorbed or separated include particulates, water in the form of dissolved water (humidity) or a dispersed water phase (mist or spray). Other materials are acidic or basic reacting compounds. Acid compounds include hydrogen sulfide, sulfur dioxide and other such species basic components include ammonia, amines, quaternary compounds and others. Further reactive gases such as $Cl_2$, $SO_2$, cyanide, phosgene and others can pose hazards. Lastly, a number of other compounds are objectionable due to odor, color or other undesirable properties. The removal of all such materials from a fluid phase, if possible, can be helpful in many end uses. The active layers of existing systems suffer from problems relating to the mechanical instability of the particulate in the layers. In many structures the particulate is not mechanically fixed in the layer and can be dislodged easily. In many structures, the amount of active materials available is limited by the nature of the substrate and the amounts of active material that can be loaded.

Donaldson Company has also filed U.S. Ser. Nos. 60/773,067, 11/354,301 and PCT/US2007/004043. These applications disclose related nanofiber webs containing particulate materials. These particulate are biological materials, inert particulate that act a spacer materials providing reduced solidity and other physical attributes and active adsorbant, absorbent or reactive particles. These structures provide reduced solidity, reactive adsorptive and absorptive capacity and other attributes.

Super absorbent, absorbent or water swellable anionic polymers are used in certain consumer articles and in industrial applications. These applications typically relate to disposable articles in consumer, hazmat, etc. applications. These typically comprise crosslinked acrylic copolymers of alkali metal salts of acrylic acid and acrylamide or other hydrophilic monomers such as 2-acrylamido-2-methylpropanesulfonic acid.

While both surface loading media and depth media have been used in the past and have obtained certain levels of performance, a substantial need remains in the industry for fluid phase separation, treatment and filtration media that can provide new, different and enhanced performance characteristics than have been formerly obtained

SUMMARY OF THE INVENTION

The web, filter, or other flow-through or flow-by structure of the invention can comprise a layer comprising a superabsorbent particulate, fiber or fabric. The superabsorbent layer can be a part of a substantially continuous nanofiber layer or can be used with such a layer. Optionally a reactive, absorptive, or adsorptive fiber spacer or separation means in the form of a particle can be combined with, or otherwise dispersed in, the fiber mass containing the super absorbent.

In one aspect, the web comprises a continuous fibrous structure with a super absorbent nonwoven that can treat a fluid stream, in a flow through or flow by mode. The fluid stream can be a gas, or liquid with entrained materials. The entrained materials can be soluble or insoluble in the mobile fluids and can be particulates of either liquid or solid impurities. Liquid water is a common impurity in fuel. The liquids can be exemplified by aqueous solutions, nonaqueous fluids, water, oils, and mixtures thereof.

In another aspect, the web comprises a continuous fibrous structure with a continuous superabsorbent fiber phase or a super absorbent particulate phase. The fuel can be treated such that entrained or dissolved water can be reduced well below water saturation concentration. In Jet A fuel, for example the saturation concentration is about 120 ppm on the total fuel. Such a phase can be used to treat a fluid stream in a flow by mode with no filtration aspect. The fluid stream can be a gas, or liquid with entrained materials. The entrained materials can be soluble or insoluble in the mobile fluids and can be particulates of either liquid or solid impurities. The liquids can be exemplified by aqueous solutions, nonaqueous fluids, water, oils, and mixtures thereof.

In a second aspect a similar structure can also act as a filter in a flow through mode. The super absorbent fiber fabric or particulate is dispersed in or used with the nanofiber web. The filter can be used to filter a mobile fluid such as a gaseous stream or a liquid stream. The filter can be used to remove impurities from the liquid stream or from the gaseous stream. Such impurities can be entrained particulates. The flow through and flow by structures can be used in structures that need no PTFE, stretched expanded Teflon® or other related porous fluoropolymer components for successful activity.

One additional aspect of the invention is a method of preventing the introduction of contaminated water fuel into a fuel reservoir using "shut-off", valve or "fuse" properties of the super-absorbent nonwoven. In "shut off" or "fuse" mode, an element used in a flow through mode, containing the super-absorbent nonwoven absorbs water in the fuel and begins immediately to swell sufficiently such that the swollen materials fill the area and stop fuel flow. This mode is useful in aviation fuel applications where water contamination is common and can cause engine failure. The fabric compositions of the invention rapidly stop flow without contaminating the fuel with any contaminant particulate or materials from the fuse.

The compositions of the invention can comprise a nano fiber and a woven or nonwoven superabsorbent layer or a combination of nanofiber and superabsorbent particulate or fiber. The superabsorbent fiber is in the form of the nonwoven layer. In such a structure, the nanofiber layer is formed in conjunction with the superabsorbent nonwoven layer. Such nonwoven layers typically comprise a nonwoven structure made of super absorbent fiber using typical nonwoven manufacturing techniques. The nonwoven layer can comprise substantially all superabsorbent fibers or the fibers can be combined with secondary fibers and other woven or nonwoven, film or sheet layers. Secondary fibers that can be used in combination with the superabsorbent fibers are discussed separately in this disclosure.

The nonwoven comprising the superabsorbent fibers can be used with other layers such as film layers, microporous film layers, mesh layers, scrim layers, filtration support or media layers or other layers useful in providing structure or other useful properties to the nonwoven layer. The nonwoven layer can be substantially all superabsorbent fiber or can be a combination of superabsorbent fiber and secondary fiber. When used, the proportions of superabsorbent fiber to secondary fiber can range from about 95 wt % superabsorbent fiber and 5% secondary fiber to approximately 5% superabsorbent fiber and 95% secondary fiber. Further, the nonwoven structure containing the superabsorbent fiber can have separate layers of nonwoven materials. Such structure can contain 1-3 or more layers of nonwoven fabric typically 2-5 layers of nonwoven fabric where the multilayer structure is used. The layers can be substantially similar or can be substantially different in both materials and construction. For example, one layer can comprise substantially non-superabsorbent nonwovens while a second layer can comprise substantially all superabsorbent nonwovens. A third layer can comprise a combination of superabsorbent fiber and secondary fibers. Variations and combinations of different layers and different combinations of superabsorbent fibers and secondary fibers are contemplated within this disclosure. Preferred superabsorbent media is an airlaid media made by Concert Industries: DT 325.100 airlaid grade manufactured with Type 101 superabsorbent fibers made by Technical Absorbents. The superabsorbent fibers were 10 dtex fibers and were 6-mm long (typical airlaid sizes); they are a sodium polyacrylate polymer. The composition of the airlaid was ~40% superabsorbent fiber, 30-40% cellulose, and 20-30% polyester bicomponent. The current properties of the media include a basis weight of 325 g/m$^2$, a thickness of 2.5 mm (0.1 inches), a density of 0.1 g/cm$^3$, an absorbent capacity of 35 g water/g media and a dry tensile of 9.5 lb/in.

In the nonwoven embodiment, the superabsorbent fiber can be formed into a discrete layer, dispersed in other fiber layers or dispersed in the nanofiber. For the purpose of the particulate superabsorbent embodiment, by "dispersed in the web," is meant that the particulate or super absorbent particulate is adhered to the fiber, held within a void space within the web or in a pocket penetrating partially into the web creating a space in the web surface. Once formed, the web comprising the nanofiber layer containing the super absorbent particulate of the invention can be combined with a media layer. That form can be used in a flow-by treatment unit or used in a flow-through filtration unit having adsorptive/absorptive or reactive properties. In a flow-by or pass-through unit, the media is simply configured in a form through which the mobile fluid can pass over the web unimpeded by any filtration layer and simply contact the absorptive/adsorptive or reactive species formed in the nanofiber layer adjacent to the flow path of the fluid media. Alternatively, the nanofiber layer containing the active particulate and media can be formed in a flow-through filtration structure that can remove particulate from the mobile fluid while in the infiltration mode, the media of the invention can, in a filtration mode, remove the entrained particulate from mobile fluid and at the same time absorb, adsorb or chemically react with unwanted materials in the fluid, phase that may or may not be in a particulate form.

The term filter refers to the structure that is actually used in treating a mobile fluid in a flow through mode. A "filter" usually includes housing with an inlet and outlet. The term "element" typically refers to a structure that can be easily placed and replaced in a filter structure during routine maintenance.

The web of the material can also have a gradient structure. In this disclosure, the term "gradient" indicates that some component (density, solidity, fiber size, etc.) of the web varies from one surface of the web to the opposite surface of the web. The gradient can be characterized by a variation in amount of active particulate, varying proportions of active and inert particulate, or other variation in particulate. The gradient can also be characterized in terms of a variation in the weight or the number of fibers. The gradient is formed by forming successively more or less fibers or more or less particulates within the web as the web is formed. Further, the concentration of spacer means or particulate can have a gradient aspect in which the size, weight or number of particulate materials per volume is substantially increased or reduced from one surface of the web to the other. The media of the invention can be used in the form of a single nanofiber web or a series of fine fiber webs in a filter structure. The term "nanofiber" indicates a fiber having a fiber size or diameter of 0.001 to less than 2 microns or about 0.001 to less than 1 microns and, in some instances, 0.001 to 0.5 micron diameter.

For the purpose of this patent application, the term "adsorptive" indicates a particle that is active to adsorb and accumulate material from a fluid stream on the surface of a particle. The term "absorptive" indicates that the particle has the capacity to accumulate material from a fluid stream into the interior or void space or spaces within a particle. "Chemically reactive" indicates that the particulate has the capacity to react with and chemically change both the character of the particle and the chemical character of the material in the fluid stream. A "fluid stream", in this application, indicates either a gaseous or a liquid stream that can contain a dispersed or dissolve contaminant such as a particulate or water component. The particulate can be either filtered from the fluid stream or the particulate can be adsorbed, absorbed or reacted with the particulate material of the invention. The term "active particulate", when used in this disclosure, refers to the absorptive, adsorptive or reactive particulate. The term "inert particulate" refers to a particulate that has no substantial absorptive, adsorptive or reactive capacity. Such particles can be used as a separation means or to occupy space.

For the purpose of this invention, the term "media" includes a structure comprising a web comprising a substantially continuous nanofiber mass. The media can comprise a support web and other components. The separation or spacer materials of the invention can be dispersed in the fiber or can be combined with the nanofiber layer. In this disclosure the term "media" indicates the web of the invention, comprising the nanofiber and dispersed particulate in combination with a substrate of some active or inert type disclosed herein. The term "element" indicates the combination of the "media" of the invention with another component including cartridge components in the form of (e.g.) cylinder or flat panel structures. In this disclosure, the term "web" includes any fabric or film layer and can include the substantially continuous or contiguous nanofiber phase with or without the spacer or particulate phase. A continuous web is necessary to impose a barrier to the passage of a particulate contaminant loading in a mobile phase. A single web, two webs or multiple webs can be combined to make up the filter media of the invention.

DETAILED DISCUSSION OF THE INVENTION

Figure 1:
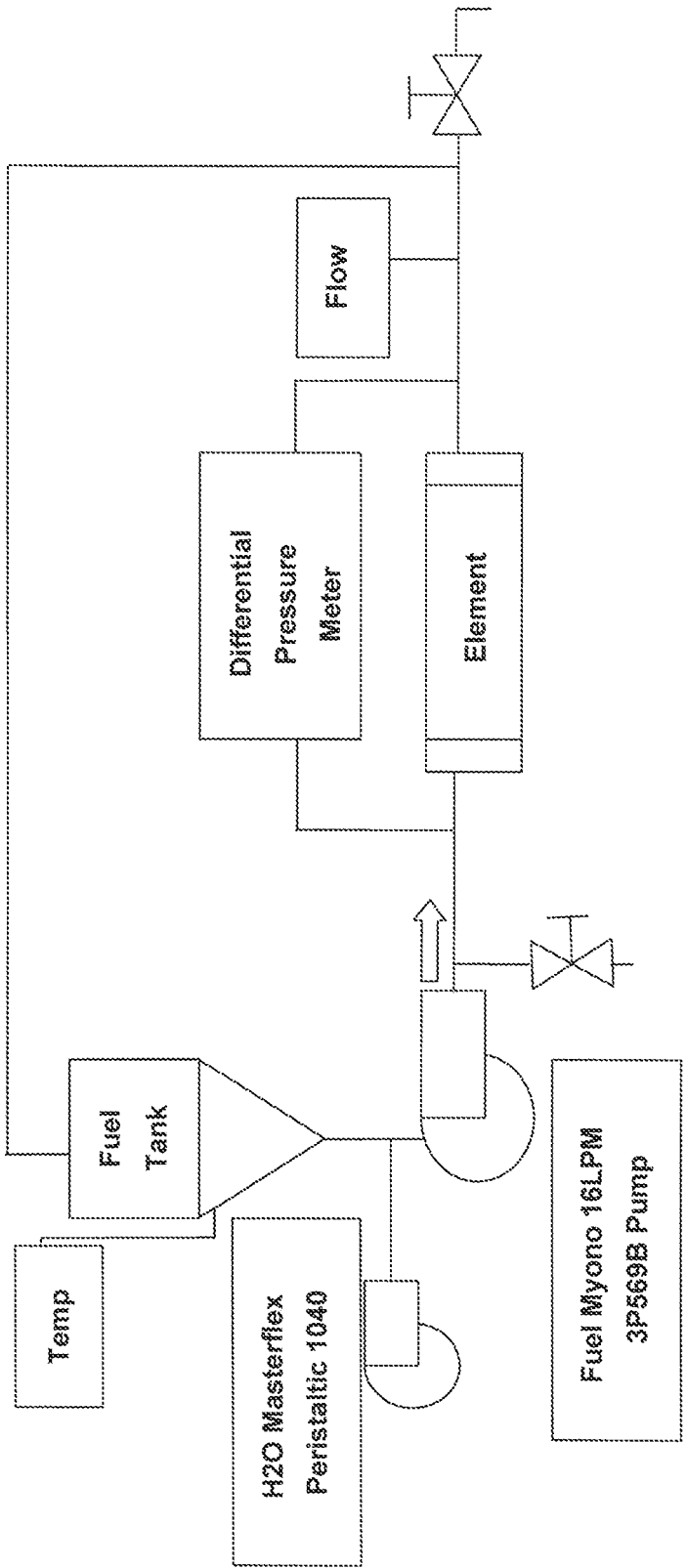
FIG. 1 shows the flow diagram of the test system, which was used to measure water concentration of test fuel before and after it was filtered through composite samples

The fabric, web, filter, or other flow-through or flow-by structure of the invention can comprise a substantially continuous nanofiber mass and a layer containing the super absorbent particulate, fiber or fabric of the invention. The fabric, fiber and particle or fiber can be made by fiber forming techniques and fabric weaving or nonwoven manufacturing principles. The fiber can be made by forming fiber from a SAP fiber or a combination of polymer and SAP or fiber. Alternatively the SAP or fiber can be added to the fiber after formation. Optionally a reactive, absorptive, or adsorptive fiber spacer or separation means in the form of a particle can be combined with, or otherwise dispersed in, the fiber mass containing the super absorbent. The particulate in a web must contain at least some super absorbent particulate but can also comprise an amount of another particulate or blend of dissimilar particulates. For example, a superabsorbent fiber can be air laid or wet laid into a layer and combined with a nanofiber or other useful layers. In another example, a super absorbent particulate can be used or used when blended with an inert particulate for use in such a layer.

The inert particulate can comprise a single particulate or can be a blend of inert particulate that differs by composition particle size, particle morphology or some other particle aspect. Similarly, the super absorbent particulate can comprise a mixture of particulates including different active particulates. For example, a super absorbent material can be used with a carbon particulate or could be blended with a zeolite particulate. Alternatively, a carboxy methyl cellulose particulate can be blended with an ion exchange resin particulate in an active layer. Further, such active particulate can have a blended particulate in the sense that particulates of different size, shape or methodology can be combined in the active layers of the invention. The term "entrained particulate" refers to impurities in the mobile fluid while the term "dispersed particulate" refers to the particulate deliberately included within the fiber layers of the invention.

The web of the invention can be used in one of two separate modes. These modes are designated as "flow-through" or "flow-by". A single unit can have regions of both modes. In the flow-through mode, the mobile fluid, liquid or gas, passes through the nanofiber layer and substrate in a filtration mode with at least a portion of the flow path as a flow substantially normal to the plane of the fiber layer. Such a flow path can have a tortous route but when contacting the layer is at or near a normal orientation. The entrained particulate can encounter and be removed by the element and as the fluid passes through the layers in contact with the particulate, the particulate can react with absorbed or adsorbed chemical materials suspended or dissolved in the fluid.

In the flow-by mode, the fluid path is generally parallel to the plane of the nanofiber layer or element surface. In the flow-by mode, flow can be turbulent but the fluid typically contacts the surface of the layer at it flows past the layer and does not substantially flow through the element. While depending on viscosity, flow rate, turbulence, temperature, element configuration, the fluid can to some degree penetrate the layer and can flow from layer to layer, the primary mode of transport of the fluid is bypassing the layer in a direction substantially parallel to the layer's surface. In such a mode, the liquid can contact the surface of the layer and chemical materials dissolved and suspended in the fluid can react with, be absorbed, or adsorbed by the particulate.

The flow-through and flow-by element can be used in a variety of formats. Flow-through element can be used in conventional filter structures including cartridge panel in some other filter structures, with the element in a pleated or unpleated mode. Similarly, the flow-by media can be included in the panel and cartridge structures.

One preferred mode of use of either flow through or flow-by material is in a rolled media. Rolled media are prepared by first forming the nanofiber and SAP fabric or SAP particulate layer on a substrate preferably a filter substrate. The combined materials can be heat treated if needed. The web and substrate can be rolled into a multi-layered roll having (e.g.) 2 to 50 layers. The thickness of the roll, or a separation between the layers, determines the flow rate of fluid through the structure. The flow rates can be improved by introducing channels into the rolled media.

Such channels can be preformed in the substrate upon which the nanofiber is spun, or the channels can be formed into the element after the nanofiber layer is formed on the substrate and then heat treated if necessary. Mechanical forms or spacers can be included with the processing steps. The forms or spacers can introduce the channel into the structure. At least one spacer portion can be included with the rolled material to inherently form a channel in one portion of the rolled structure. Further, additional spacers can be placed such that each layer of the rolled structure has at least one channel portion. An arbitrary number of spacers can be used. At least one spacer per layer can be used up to 5, 10 or 20 spacers per layer. After the spacer layers form a channel in the element, the spacers can be removed. The spacers can be removed in one mode by unrolling the element and physically removing the spacers from the element. However, in another mode, the spacers can be simply washed from the rolled assembly using a solvent in which the spacer (but not the substrate nanofiber or particulate) is soluble, thus removing the spacers and leaving flow-through channel structures. The spacers can be configured in virtually any shape or structure as long as the spacer can provide a channel from the first end of the roll to the second end of the roll providing a flow through path for fluid.

Preferably the dimensions of the channel are greater than about 1 mm in major dimension and can range from about 1 to 500 mm in major dimension. The profile of the channels can be round, oval, circular, rectangular, square, triangular, or other cross-sectional profile. The profile can be regular, or it can be irregular and amorphous. Further along the channel, the cross-sectional profile of the channel can vary from one end to the other. For example, at the intake end of the rolled structure, the channel can have a relatively large cross-sectional area, whereas at the opposite end the cross-sectional area can be smaller than the input end. Additionally the input end can be smaller in cross-sectional area than the output end. Any other variation in size of the spacer can increase turbulence in the flow resulting in improved contact between the fluid and the particulate.

The filter or flow-through or flow-by structure of the invention is uniquely suited to provide useful properties. The flow-through structure can be used to absorb/adsorb or chemically react with mobile fluid phases that flow through the flow-through structures. The dispersed particulate within the flow-through structures can react with the mobile fluid (either liquid or gas), or absorb/adsorb, or react with intervening material within the fluid stream. The flow-through structures can act both as a filter, and as a structure that can react with, absorb, or adsorb materials in the fluid stream. Accordingly, the dual function flow-through structures can remove undesired particulate that is typically an insoluble phase in the fluid stream. In addition, the flow-through structures can also react with, absorb, or adsorb insoluble and soluble components of the fluid stream.

A particularly important fluid stream for the application includes air streams that can contain contaminates such as dust particulate, aqueous mist or humidity, solvent residue, oil residue, mixed aqueous oil residue, harmful gases such as chlorine, benzene, sulfur dioxide, etc. Other typical liquid mobile phases include water, fuel, oils, solvent streams, etc. Such streams can be contacted with the flow-through structures of the invention to remove liquid or particulate contaminates, color-forming species, and minor amounts of soluble impurities. In many cases, the streams (both gaseous and liquid) can be contaminated by biological products including prions, viruses, bacteria, spores, DNA segments and other potentially harmful biological products or hazardous materials. Typically water can be a contaminant in hydrocarbon and other nonaqueous streams while hydrocarbons can be a contaminant in an aqueous stream.

The web of the invention can contain the nanofiber layer with the super absorbent fabric, particulate or fiber dispersed within or formed on or combined with the nanofiber layer, optionally with another particulate to absorb/adsorb or react with materials entrained in the mobile fluid phase. Such an element or web can be combined with other active or reactive species in a variety of forms.

The superabsorbent fabric can be formed of super absorbent fiber or can be made with mixed or blended conventional fiber and super absorbent fiber. The fibers can be combined in a single layer or formed into discrete layers. The fabrics can be made of the select fibers using weaving or air laid, wet laid or other nonwoven techniques.

The particulate of the invention can be discrete particles separate from the fiber or the particulate can be adhered to or on the surface of the fiber. The particulate can be embedded into the fiber and can be partially or fully surrounded by the fiber mass. In order to form these structures, the particulate can be combined with the fiber after spinning, can be added to the fiber during spinning in the time the fiber dries and solidifies, or can be added to the spinning solution before spinning such that the particulate is embedded partially or fully in the fiber.

One method of forming a useful layer can be by dispersing the super absorbent particulate or fiber in an aqueous or non-aqueous phase containing components, either forming the active particulate into a sheet layer followed by fiber, or adhering the active particulates to one or more of the components of the web or element of the invention. Any of the active particulates of the invention can be incorporated into either an aqueous or non-aqueous liquid phase for such purposes. In forming the non-aqueous material, a non-aqueous solvent, preferably a volatile solvent including such materials as lower alcohols, ethers, low boiling hydrocarbon fractions, chloroform methylene chloride, dimethyl sulfoxide (DMSO) and others, can be prepared by incorporating the active particulate of the material with soluble or dispersible binding materials. Such a solution can be applied to a fiber particulate sheet like substrate or other materials to form a layer containing the active particulates that can act in that form to absorb/adsorb or react with materials entrained in the mobile fluid phase. Alternatively, the SAP or fiber or optional active particulate of the invention can be dispersed in an aqueous solution or suspension of binding materials that can be similarly combined with, or coated on, fiber particulate or web sheet like substrates to form an active layer of active particulate. Alternatively, the active particulate of the invention can be dispersed or suspended in a mixed aqueous organic phase that combines an aqueous phase with organic phase. The organic phase can comprise additional solvents or other organic liquids or can comprise aqueous polymeric phase such as acrylic polymers, PTFE polymers. Such mixed phases can form layers containing the active particulate and additionally can contain cross-linking components that can form bonds between adjacent polymers, further curing the coatings of films.

A heat treatment or thermal bonding process can be used to form a distinct layer in which there is no fully distinct fiber. Such a treatment can be used with any construction with thermoplastic fiber. Such layers can include the SAP or the superabsorbent fiber materials. The heat treatment can heat the individual fibers to a temperature at or above a fusion or melting point of the individual fibers and then cause the fibers to adhere, coalesce, or form into a fused network, membrane or membrane-like structure. Depending on the temperature and pressure and time of the heat treatment, the heat treatment can convert the fibers from a randomly distributed layer of fiber of intermediate length having only surface contact into a layer where fibers are more intimately associated. At a minimum, the fiber is heated such that at the intersections of the fibers, the fibers fuse to form a fused network. With additional heat pressure, or time of heat treatment, the fibers can further melt and further coalesce into a more intimately associated web. With further temperature, time, and pressure, the fiber can more fully melt and spread into a porous membrane-like structure. The heat treatment also can alter the location of the super absorbent particulate or fiber or other particulate. In the instance that the fiber is simply distributed throughout, the particulate is distributed through the nanofiber. The heat treatment can fix the super absorbent particulate or fiber into a structure in which the particulate is surface bonded to the heat treated fibrous, web, or membrane-like structure; however, depending again, on the temperature, time of heating, and pressure, the particulate can be incorporated into and throughout the porous membrane-like structure. Such a heat treated or calendared structure can have a layer of thickness that approximates that of the original nanofiber layer, or results in a layer that is thinner than the original nanofiber layer. Accordingly, if the original nanofiber layer has a thickness that ranges from about 0.5 to 200 microns, the resulting layer can have a thickness that ranges from about 0.5 to about 150 microns or smaller often up to 100 microns and sometimes up to 50 microns, depending on the amount of fiber spun, the particulate content and the degree of heat treatment, including heating, pressure, and time. One form of such a heat treatment process is the calendaring operation that can be used thermally. The calendaring process uses rollers, rollers and embossers, or embossers to form the heat treated layers. An embosser can be used with a bonding pattern that can result in a regular, intermediate, or random pattern. When a pattern is used, the pattern can occupy up to 50 percent of the surface area or more. Typically, the bonded array occupies about 1 to 75 percent of the surface area, often about 10-50 percent of the surface area.

Depending on the nature of the nanofiber used in the various layers and the rate of manufacture of the composites, the calendaring process parameters such as time, temperature, and pressure can be varied to achieve acceptable results. The temperature of the calendared rollers can range from about 25-200° C. The pressure exerted on the layers using the calendaring rollers or combination of rollers can range up to 500 psi and the speed of the composite through the heat treatment station can range from about 1 to about 500 feet per minute. The operating parameters of the heat treatment station must be adjusted such that the appropriate amount of heat is delivered to the fiber to obtain the correct ultimate structure. The heat cannot be so little as not to soften or melt some portion of the fiber and cannot be such that the fiber is simply melted and dispersed into the substrate. The total heat delivered can be readily adjusted to bond the fiber, soften the fiber overall or fully form the fibers into a porous membrane. Such minor adjustment of the operating parameters is well within the skill of the artisan.

The web or element of the invention can be comprised of a variety of different layers. Such layers can include both active and inactive layers. Active layers typically comprise a web of nanofiber with the super absorbent particulate, super absorbent fiber or super absorbent fabric combined with or dispersed within the nanofiber or other impregnated layers or layers containing super absorbent particulate, fiber fabric or other adsorbent/absorbent or reactive particulate or other such structures. A super absorbent material is one that can absorb a greater amount of water than it weight, such as, at least 10 grams of water per gram, or 20 to 100 grams of water per gram of material. Such layers can be formed into the useful element of the invention combined with protective layers, spatial layers, active layers, inactive layers, support layers, and all can be incorporated or encapsulated into conventional cartridge panel or other such protective structures. A preferred form of the active particulate comprises an adsorbent carbon particulate.

In one embodiment of the invention, a superabsorbent nonwoven layer is combined with a nanofiber layer. In a second embodiment a superabsorbent layer has a nanofiber layer formed on each side of the planar layer. These embodiments can be used with filter layers that can filter solid particulate in coarse particle sizes (about 10 to 50 microns) or fine particulate (about 1 to 10 microns). Such layers can be formed on a perforate core structure. Such core can be cylindrical molded grid like plastic structures. Such cores can be used with other screen and support materials.

There are a variety of types of superabsorbent polymers (SAP) that can be used in particulate, fiber or fabric form. Such materials include starch-graft polymers, acrylic or cross-linked polyacrylates polyacrylamide, poly(ethylene oxide), poly(vinyl alcohol), polysuccinimides, and hydrolyzed polyacrylonitrile polymers. Preferred types of superabsorbent polymers are starch-graft polymers, acrylic or cross-linked polyacrylates. As used herein and unless otherwise specified the term "super-absorbent particle or fiber" means a particle or fiber made from a super-absorbent polymer or comprising a super-absorbent material. Specific super-absorbent particle or fiber are fibers made from super-absorbent polymers. Specific super-absorbent particle or fiber are substantially free (e.g., contain less than about 50, 10, 5, 1, or 0.5 weight percent) of materials that are not super-absorbent. These super absorbent materials in particle, fiber or fabric swell to form gels. Most super-absorbent polymers currently used are sodium acrylate-based polymers which have a three dimensional network-like molecular structure. Small amounts of crosslinkers play a major role in modifying the properties of superabsorbent polymers. The type and quantity of crosslinkers control both the swelling capacity and gel modulus. Other suitable water swelling materials are natural-based super-absorbent fibers such as, but not limited to, crosslinked polysaccharides or modified cellulose products. Still other super-absorbent materials that can be used to provide fibers useful in particular embodiments of this invention are described below, as are various fabric forms of such fibers.

Super-absorbent particle or fiber can be made from ethylenically unsaturated carboxylic monomers and copolymerizable ethylenically unsaturated monomers. These fibers are formed by extruding a solution or dispersion of the polymeric material in a solution of the secondary matrix copolymer in its non-crosslinked state into a gaseous environment wherein solvent is removed to form the fiber, and subsequently crosslinking the matrix copolymer. See e.g., U.S. Pat. Nos. 5,466,733 and 5,607,550, and European patent application 26 84 98, each of which is incorporated herein by reference for teaching of superabsorbent materials. This technology has been used by Oasis Technical Absorbents Ltd, UK and Camelot (Canada). One example of fibers made by this method are fibers of polysodium acrylate. Another example of super-absorbent fibers that can be used in this invention are core/sheath structure bicomponent fibers, wherein the sheath is an outer layer of hydrolyzed polyacrylonitrile salt, such as, but not limited to, polysodium acrylate or polyammonium acrylate, and the core is polyacrylonitrile. Examples of such fibers include LANSEAL F, (Toyobo, Japan), which has a core made of acrylic fiber and a sheath made of polyacrylate superabsorbent. In specific fibers, the outer layer swells to about 12 times in diameter by imbibing water. The polymer can contain substituents, such as alkyl, such that functional moieties bound to the polymer include, but are not limited to, ammonium acrylate, acrylic acid, and un-hydrolyzed acrylonitrile. Specific examples of bicomponent media that can be made with and without the superabsorbent particles or fiber are shown in U.S. Pat. No. 7,314,497 which is specifically incorporated by reference herein for its teaching of media with fused bicomponent fibers.

Other super-absorbent fibers that can be used in the invention are made of thermoplastic polymeric fibers and super-absorbent particles, which can be attached to the thermoplastic fibers by thermobonding. For example, they can be bonded by heating the polymeric fiber to a temperature at which adhesion is obtained between the fiber and the super-absorbent particles. See, e.g., U.S. Pat. No. 6,194,630, which is incorporated herein by reference.

Another type of super-absorbent fiber comprises partially hydrolyzed, internally plasticized, crosslinked, superabsorbent fibers derived from polysuccinimide fiber. See, e.g., U.S. Pat. Nos. 6,150,495 and 5,997,791, both of which are incorporated herein by reference for its teaching of super absorbent materials. The crosslinked hydrolyzed polysuccinimide fibers are made of polyamide containing at least three divalent or polyvalent moieties distributed along the polymer chain.

Other super-absorbent materials that can be used in various embodiments of this invention are disclosed in European patent application 43 78 16, which is incorporated herein by reference. These fibers are provided as a nonwoven wet-laid superabsorbent material produced by the process of blending superabsorbent polymer particles, and drying the superabsorbent slurry/fiber mixture to form a nonwoven wet-laid superabsorbent material.

Specific examples of super-absorbent materials that can be provided as particle or fiber and used in various embodiments of this invention include, but are not limited to, hydrolyzed starch acrylonitrile graft copolymer; neutralized starch-acrylic acid graft copolymer; saponified acrylic acid ester-vinyl acetate copolymer; hydrolyzed acrylonitrile copolymer; acrylamide copolymer; modified cross-linked polyvinyl alcohol; neutralized self-crosslinking polyacrylic acid; crosslinked polyacrylate salts; neutralized crosslinked isobutylene-maleic anhydride copolymers; and salts and mixtures thereof.

Other super-absorbent materials that can be used in the invention include, but are not limited to, those disclosed by U.S. Pat. Nos. 6,433,058; 6,416,697; 6,403,674; 6,353,148; 6,342,298; 6,323,252; 6,319,558; 6,194,630; 6,187,828; 6,046,377; 5,998,032; 5,939,086; 5,836,929; 5,824,328; 5,797,347; 5,750,585; 5,175,046; 4,820,577; 4,724,114; and 4,443,515, each of which is incorporated herein by reference for its teaching of super absorbent materials. Additional examples include, but are not limited to: treated polyacrylonitrile fibers (e.g., fibers treated with metal hydroxides or ammonia); crosslinked partially neutralized maleic anhydride copolymer spun fibers; polyacrylonitriles co-spun with superabsorbent polymers such as acrylate/acrylonitrile copolymers; crosslinked polyacrylate and copolymer fibers, such as those described in Japanese Patent No. 89/104,829, which is incorporated herein by reference; fiber flocks containing super-absorbents as described in U.S. for its teaching of super absorbent materials U.S. Pat. No. 5,002,814, which is incorporated herein by reference; and polyoxyalkylene glycol fibers, such as those described in U.S. Pat. No. 4,963,638, which is incorporated herein by reference for its teaching of super absorbent materials. Natural-based superabsorbent fibers such as, but not limited to, crosslinked polysaccharides and modified cellulose products can also be used in certain embodiments of the invention, as can cellulosic-based super-absorbents. Examples of preferred super-absorbent fibers are LANSEAL (Toyobo, Japan); N-38 type 101, type 102, type 121 and type 122 (Oasis Technical Absorbents, UK); and Camelot 808, 908, and FIBERSORB (Arco Chemicals).

The selection of super-absorbent material(s) for use in a material of the invention will depend on a variety of factors, including the physical and chemical properties of the super-absorbent material and its use in a gaseous or liquid application. For example, factors to be considered when selecting a super-absorbent material include, but are not limited to, the amount of water it can absorb, its rate of water absorption, how much it expands when it absorbs water, its solubility in non-aqueous solvents with which it may come into contact, its thermal stability, and its biocompatibility.

The physical and chemical properties of a super-absorbent material depend, at least in part, on the physical and chemical properties of the specific molecules from which it is made.

For example, the bulk properties of a super-absorbent material made from a particular polymer can depend on the average molecular weight and hydrophilicity of that polymer. The bulk properties of the super-absorbent material can further depend on the amount and type of crosslinking that holds the polymers together.

Crosslinking can be of at least two types, and mixtures thereof. A first type is covalent crosslinking, wherein polymers are covalently attached to one another by methods well known in the art. A second type is physical crosslinking, wherein polymers are associated by hydrogen bonding, ionic bonding, or other non-covalent interactions, which can provide crystalline or semi-crystalline super-absorbent materials. Super-absorbent materials that are covalently crosslinked are typically more durable than physically crosslinked materials, but often contain chemical residues from the crosslinking process. Consequently, chemically crosslinked super-absorbent materials may not be suitable for use in applications wherein the leaching of such residues must be avoided. The preferred materials are highly crosslinked and have no easily measured molecular weight.

The durability and toughness of super-absorbent materials typically increase with increased crosslinking. However, the ability of super-absorbent materials to rapidly expand and absorb water can decrease with increased covalent crosslinking. For example, sodium polyacrylate-based super-absorbent materials contain long, interwoven polymer chains having a number of ionic functional groups. When contacted with water, the ionic functional groups disassociate to provide an ionized polymer network. Swelling of the material occurs as ionic crosslinking is eliminated, and is accelerated due to repulsions between anions bound to the polymeric chain. As the material swells, large void volumes are created, which can accommodate the absorption of water until the polymer matrix can no longer expand. The scale of expansion is determined, at least in part, by the degree of crosslinking. Without intermolecular crosslinking, super-absorbent materials would expand infinitely; i.e., they would dissolve.

The degree to which a super-absorbent material absorbs water is related to the concentration of ionic functional groups and crosslinking density in it. In general, water absorption increases with an increased concentration of ionic functional groups and/or a decrease in crosslinking density. Of course, when particles or inclusions of super-absorbent material are trapped within the porous matrix of a self-sealing material, their expansion is also restricted by the matrix surrounding them.

Although starch-graft polymers were the first developed, these polymers suffer from the disadvantage of salt instability. Polyacrylate polymers initially had difficulty achieving high absorption under load (AUL) characteristics at moderate pressures, as the materials would partially dissolve. However, this problem was solved by partly cross-linking the polyacrylate to provide a networked structure.

The sodium acrylate and starch-graft polymers account for virtually all of the commercial volume of super absorbent polymers, and are the focus of this report. Thus, sodium acrylates are expected to remain the commercially preferred SAP material. Starch-grafted polymers were originally developed by the United States Department of Agriculture and patents were licensed to General Mills Inc. among others. This polymer is prepared by graft-polymerizing acrylonitrile onto a starch substrate to give the type of structure shown:

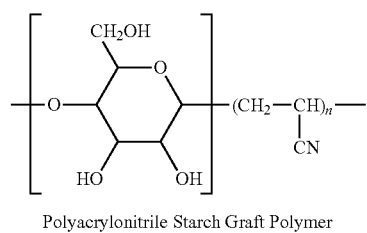

Polyacrylonitrile Starch Graft Polymer

The polymerization reaction is as follows:

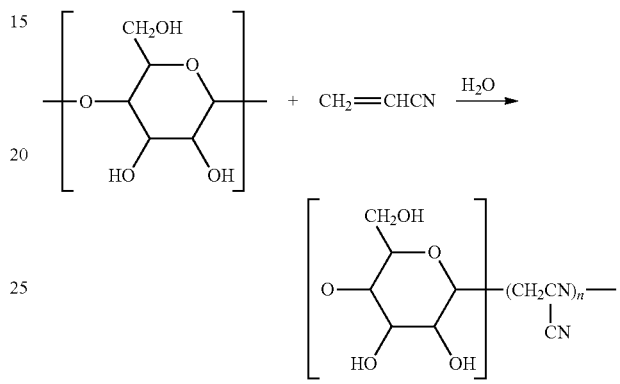

Ammonium ceric nitrate has been used as an initiator with 0.1 mole cerium ions in one normal nitric acid. Optimal results are obtained when starch is gelatinized by heating in water at 80° C. for an hour prior to the reaction, which occurs at around 30° C. and atmospheric pressure. Gelatinization breaks down the starch chains giving increased reactivity with the acrylonitrile and a higher molecular weight product. Saponification of the graft polymer with an alkali yields a final product with nitrile, amide, and carboxyl functionalities. The reaction is shown on the next page.

The saponification reaction takes place at 95° C. and atmospheric pressure with a ratio of alkali to acrylonitrile of 0.6-0.8 to 1 for saponification. Washing with water removes excess salts produced during saponification. Acrylonitrile was used originally; acrylic acid monomer, which is non-toxic, is now preferred. After this reaction, drying and pulverization give a white powder.

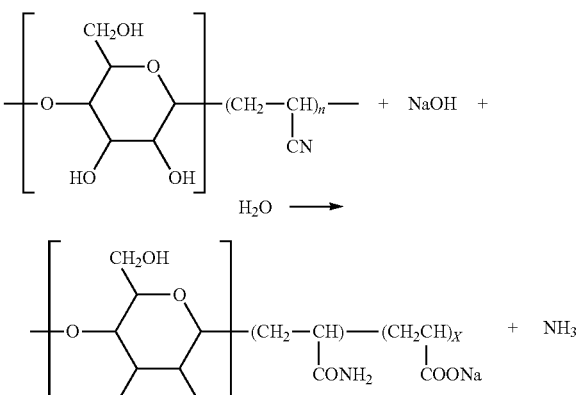

Saponified Polyacrylonitrile Starch Graft Polymer

Polyacrylate SAPs involve the copolymerization of acrylic acid, sodium acrylate, and a cross-linking agent to provide a minimally cross-linked polymer containing carboxyl and sodium carboxylate groups. The basic reaction chemistry is shown in the following:

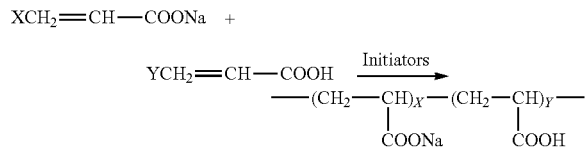

Cross-linking during polymerization is important in that it yields a networked polymer, which will not dissolve in water, and can absorb and retain water under low load. A typical cross-linking agent is trimethylolpropane triacrylate in concentrations of 0.05 mol percent relative to the monomer. Cross-linking is also possible with ethylene glycol diglycidyl ether which reacts with carboxyl groups on the polymer molecules to crosslink them.

Controlling molecular weight of the polymer product is important in order to balance performance versus yield. Low molecular weight species are extractable, whereas high molecular weight species require a longer polymerization time. Commercial superabsorbent polymers typically contain between 5 and 20 percent extractables.

To carry out the polymerization, an acrylic acid solution is neutralized with sodium hydroxide to a level of 65-80 mol percent to provide a pH compatible with human skin:

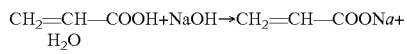

Thereafter, the polymerization is carried out at 30-45 weight percent of the monomers in aqueous solution at 75° C. and atmospheric pressure. A typical initiator for the acrylic polymer polymerization is 2,2,1-azo-bis-(2-amidinopropane)dihydrochloride. After the reaction, the material is removed, dried, ground to a fine powder, and treated with additional curing agent. The additional curing step is designed to yield a superabsorbent particle with a cross-linked "shell". The purpose of the shell is to better control swelling of the superabsorbent particle. There is a tendency of superabsorbent particles to form clumps when aqueous liquids are added, thereby reducing the diffusion of additional liquid through the partially swollen mass. Surface cross-linking of the particles controls surface swelling, thus reducing clumping.

The optional particulate materials of the invention have dimensions capable of improving the active properties and filtration properties of the media and layers of the invention. The materials can be made of a variety of useful materials that are inert, reactive, absorptive, or adsorptive. The materials can either be substantially inert to the mobile phase and entrained particulate load passing through the web or the materials can interact with the fluid, dissolved portions of the fluid or the particulate loading in the fluid. Some or all of the particulate can be inert. Preferred particulates are active, reactive, absorbent, or adsorbent materials. For the purpose of this invention, the term "inert" indicates that the material in the web does not either substantially chemically react with the fluid or particulate loading, or substantially physically absorb or adsorb a portion of the fluid or the particulate loading onto the particulate in any substantial quantity. In this "inert" mode, the particulate simply alters the physical parameters of the fiber layer and the media including one or more fiber layers. The active particulate of the invention can be added to any layer of the element of the invention using a variety of add on techniques. The particulate of the invention can be incorporated into the nanofiber layer during spinning of the fiber as discussed elsewhere in the application. In addition, the active particulate of the invention can be dissolved or dispersed into an aqueous or nonaqueous or mixed aqueous liquid and applied to any layer of a useful element of the invention.

When using an active particulate that interacts with the fluid or the particulate loading, the particulate can, in addition to altering the physical properties of the media or layers, react with or absorb or adsorb a portion of either the mobile fluid or the particulate loading for the purpose of altering the material that passes through the web. The primary focus of the technology disclosed herein is to improve the treatment properties of the layers to increase the reactivity/absorbent/adsorbent capacity or lifetime of the physical structure of the media or layers, and to improve filter performance where needed. In many such applications, a combination of an inert particle and an interactive particle will then be used.

The invention relates to polymeric compositions in the form of nanofiber such as microfibers, nanofibers, in the form of fiber webs, or fibrous mats used with a particulate in a unique improved filter structure containing the super absorbent particulate or fiber. The web of the invention comprises a substantially continuous fiber phase and dispersed in the fiber mass a super absorbent particulate or fiber. In the various aspects of the invention, the super absorbent particulate or fiber can comprise a fiber or particulate phase in the web. The super absorbent particulate or fiber can be found on the surface of the web, in surface products or throughout void spaces formed within the web. The fibrous phase of the web can be formed in a substantially singular continuous layer, can be contained in a variety of separate definable layers or can be formed into an amorphous mass of fiber having super absorbent particulate or fiber inclusion phases throughout the web randomly forming inclusion spaces around the particulate and internal web surfaces. The super absorbent particulate or fiber has a major dimension of less than about 5000 microns. For example, the super absorbent particulate or optional particulate can have a major dimension of less than 200 microns, and can typically comprise about 0.05 to 100 microns or comprises about 0.1 to 70 microns. In the substantially continuous nanofiber layer, the layer has a layer thickness of about 0.0001 to 1 cm, 0.5 to 500 microns, about 1 to 250 microns, or about 2 to 200 microns. In the layer, dispersed in the fiber, is a means comprising an SAP or optional particulate with a particle size of about 0.25 to 500 microns, about 0.5 to 200 microns, about 1 to 200 microns about 10 to 200, or about 25 to 200 microns. Such particulate is dispersed throughout the fiber in the layer. The particulate is present in an amount of about 0.1 to 50 vol %, about 0.5 to 50 vol % about 1 to 50 vol %, about 5 to 50 vol % or about 10 to 50 vol %. The fine fiber has a diameter of about 0.001 to about 2 microns, 0.001 to about 1 micron, 0.001 to about 0.5 micron, or 0.001 to about 5 microns. The fiber can be of indeterminate length or have a fiber length of 0.1 to 10 cm, 0.2 to 7 cm or 0.5 to 5 cm. The super absorbent particulate or fiber or optional particulate or combinations thereof is used in the layer in amount of about 1 to 1000 gm-m$^{-2}$, about 5 to 200 gm-m$^{-2}$ or about 10 to 100 gm-m$^{-2}$ of the layer.

The SAP and optional particulate can take a variety of regular geometric shapes or amorphous structures. Such shapes can include amorphous or random shapes, agglomerates, spheres, discs, ovals, extended ovals, cruciform shapes, rods, hollow rods or cylinders, bars, three dimensional cruciform shapes having multiple particulate forms extending into space, hollow spheres, non-regular shapes, cubes, solid prisms of a variety of faces, corners and internal volumes. The aspect ratio of the non-spherical particulate (the ratio of the least dimension of the particle to the major or largest dimension) of the invention can range from about 1:2 to about 1:10, preferably from about 1:2 to about 1:8.

The optional particulate of the invention can be made from both organic and inorganic materials and hybrid. The particulate that is non-interacting with the mobile fluid or entrained particulate phase comprises organic or inorganic materials. Organic particulates can be made from polystyrene or styrene copolymers expanded or otherwise, nylon or nylon copolymers, polyolefin polymers including polyethylene, polypropylene, ethylene, olefin copolymers, propylene olefin copolymers, acrylic polymers and copolymers including polymethylmethacrylate, and polyacrylonitrile. Further, the particulate can comprise cellulosic materials and cellulose derivative beads. Such beads can be manufactured from cellulose or from cellulose derivatives such as methyl cellulose, ethyl cellulose, hydroxymethyl cellulose, hydroxyethyl cellulose, and others. Further, the particulates can comprise a diatomaceous earth, zeolite, talc, clay, silicate, fused silicon dioxide, glass beads, ceramic beads, metal particulates, metal oxides, etc. Particulates intended for use in the present invention are characterized by average size in the range of from about 0.01 to 500 microns. Therefore, a relatively larger average size of the active particles requires a larger average size of the particulate. Particles include carbon particles such as activated carbon, ion exchange resins/beads, zeolite particles, diatomaceous earth, alumina particles such as activated alumina, polymeric particles including, for example, styrene monomer, and absorbent particles such as commercially available superabsorbent particles. Particularly suitable absorbent/adsorbent particles are low density, porous particles, and have pores and cavities including surface cavities, ranging in diameter from about the minimum for the pore size in carbon is 0.00035 microns, which is the carbon-carbon distance to 100 microns and interconnected by smaller pores. These pores and cavities beneficially provide inner surface for deposition, in particular monolayer deposition, of fine particles having an average size in the range of about 0.01 to 10 microns, and thereafter for accessibility to the immobilized fine particles. 1 $cm^3$ of these particles provides in bulk approximately 75 to 1,500 $m^2$ of available surface. Carbon particulates can be used in the form of filing divided activated carbon. Such activated carbons can be combined with other reactive adsorbent or adsorbent species that can be blended with, or adsorbed onto, the carbon surface. Other forms of active carbon can be used including carbon nanotubes, nanoparticles, nanowires, nanocarbon ropes or larger lattices or constructs in which the individual elements comprise a carbon nanotube. Such nanoparticles, such as buckyballs, smaller nanotubes (or nanotube portions thereof), nanoropes, etc. can be incorporated within the interior volume of the nanotube or incorporated into the carbon atom lattice of the nano structure. Additional atoms, molecules or components can add structure or function to the nano particulate material.

The SAP or optional particulate can be mono-disperse or poly-disperse. In mono-disperse particulate, the majority of the particles are similar in diameter or the major dimension. For example, one example of a mono-disperse particulate has 80% to 90% of the particulate within about 0.8±0.5 microns or about 1±0.25 micron. In a poly-disperse material, the particulate has a substantial portion of particles with different diameters. A poly-disperse material could be a mixture of two mono-disperse materials or a material with a substantial amount of particulate material present throughout a broad range (e.g.) 0.1 to 10 or 0.01 to 100 microns.

The spheres or other shapes can be in a variety of different physical forms including solid and hollow form. The particulate can have a substantially spherical or slightly oval shaped spherical structure. The spheres can be solid or can have a substantial internal void volume. The shell thickness of the sphere can range from about 0.05 to about 500 microns while the sphere can range from about 0.5 to about 5000 microns. Other circular structures that can be used include simple toroidal structures, spiral or helical structures, or interlocking link type chain structures.

The web can also be used in filtration applications as a surface media or depth media having a continuous web of nanofiber modified by the presence of super absorbent particulate, fiber or fabric and the optional a reactive, absorptive or adsorptive spacer or separation means in the form of a particulate that in combination with the fiber in the media, provides figure of merit, filtration efficiency, filtration permeability, depth loading and extended useful lifetime characterized by minimal pressure drop increase. The super absorbent particulate, fiber or fabric and reactive, absorptive, or adsorptive spacer or separation means causes the fiber web to attain a structure, in which the fiber mass or web portion has reduced solidity, separated fibers or separated web portions within the structure, and increased depth of fiber layer, without increasing the amount of polymer or the number of fibers in the web. The reactive, adsorptive or absorptive, portion of the fiber web can react with reactive chemical species within a mobile fluid passing through the fiber layer or such chemical components of the mobile fluid can be absorbed or adsorbed by the absorptive or adsorptive portion of the fiber layer. The super absorbent particulate or fiber or active particulate can be used with an inert particulate as long as the activity or activities of the particulate is maintained. The resulting structure obtains improved filtration properties in combination with resistance to increased pressure drop, improved (Figure of Merit), improved permeability, improved efficiency, and the ability to remove both a particulate non-reactive load and a reactive gaseous or particulate load from a mobile fluid stream passing through the fiber layer.

The nanofiber of the invention can be in the form of a structural fiber as discussed above. The nanofiber can be spun from a reactive fiber or super absorbent particulate or fiber. Such reactive fibers can be made from polymers having reactive side chains such as amines, sulfonic acid, carboxylic acid, or other functional groups of side chains. Such side chains can be derived from the polymer itself. For example, a polyamine can be formed with a highly functional polyamine leaving acid and amine and mean functionality on the polymer side chains of substituents. Similarly, polysulfone or polyacrylic acid material can be formed having active or reactive acid groups. Similarly, ion exchange resin materials can be made having, within the resin particulate, acid, strongly acid, basic, or strongly basic functional groups that can add absorbent or reactive properties to the invention. Such materials can be dissolved or suspended and can be spun with the conventional fibers of the invention, or can be spun separately into the particle containing webs of the invention.

The web can be spun in such a way to disperse the super absorbent particulate or fiber or active particulate or active separation means into the fiber. A preferred super absorbent particulate or fiber or active particulate or spacer means comprises a reactive, absorptive or adsorptive particulate. Such particulate can be dispersed within the polymer containing solution. The particle or fiber can be added to the web during formation or can be added after formation. Such a web, when electrospun, is characterized by a mass of interconnected nanofiber or nanofiber with the super absorbent particulate or fiber dispersed within the fiber web on the surface of the fiber web. Within the fiber web, the super absorbent particulate or fiber creates void spaces within the interconnected fibrous structure that reduces solidity and increases mobile fluid flow. The invention also comprises a web formed by forming a nanofiber mass with the simultaneous addition or a post spinning addition of the super absorbent particulate or fiber to the fiber layer. In such an embodiment, the particle or fiber is interspersed throughout the mass of fibrous material. Lastly, the invention involves forming the spun layer in a complete finished web or thickness and then adding the super absorbent particulate or fiber to the surface of the web or substrate prior to incorporating the web into a useful article. Subsequent processing including lamination, calendaring, compression or other processes can incorporate the particulate into and through the fiber web. One advantage of either simultaneous addition of the super absorbent particulate or fiber to the web as it is formed or to the web after formation, is obtained when the particulate is a solvent soluble particulate. Dissolving the soluble particle or fiber in the solution would result in the incorporation of the material into the fiber without maintaining the particulate as a separate phase in the web. Adding the particulate to the web after formation preserves the solvent soluble material in its particulate form.

"Figure of Merit" can be thought of as a benefit to cost ratio, where efficiency is the benefit, and normalized pressure drop ($\Delta P$) is the cost ($\Delta P$/media velocity). The "cost" is normalized so that one can compare Figures of Merit from tests run at different velocities. Figure of Merit is simply an index to compare media. Larger Figure of Merit values are better than small. The formula for calculating Figure of Merit is:

$$\text{Figure of Merit} = -\text{Ln}(\text{penetration})/(\Delta P/\text{media face velocity})$$

In the equation presented above, $\Delta P$ is the pressure drop across the media and the unit used in the equation is cm Hg; media face velocity has the unit of cm/sec; Ln(penetration) is the natural logarithm of penetration. And penetration is defined as:

$$\text{Penetration} = 1 - \text{Efficiency}$$

The standard units of measure which Figure of Merit is reported in are given below:

$$1/(\text{cm Hg})/(\text{cm/sec}) \text{ or } (\text{cm/sec})/\text{cm Hg}$$

In many applications, especially those involving relatively high flow rates, an alternative type of filter media, sometimes generally referred to as "depth" media, is used. A typical depth media comprises a relatively thick tangle of fibrous material. Depth media is generally defined in terms of its porosity, density or percent solids content. For example, a 2-3% solidity media would be a depth media mat of fibers arranged such that approximately 2-3% of the overall volume comprises fibrous materials (solids), the remainder being air or gas space.

The nanofiber layers formed on the substrate in the filters of the invention should be substantially uniform in particle or fiber distribution, filtering performance and fiber distribution. By substantial uniformity, we mean that the fiber has sufficient coverage of the substrate to have at least some measurable filtration efficiency throughout the covered substrate. The media of the invention can be used in laminates with multiple webs in a filter structure. The media of the invention includes at least one web of a nanofiber structure. The substrate upon which the nanofiber and active particulate can be formed can be either active or inactive substrate. Such substrates can have incorporated into the substrate layer active materials in the form of coatings, particulates, or fibers that can add adsorbent/absorbent or reactive properties to the overall structure.

The overall thickness of the fiber web is about 1 to 100 times the fiber diameter or about 1 to 300 micron or about 5 to 200 microns. The web can comprise about 5 to 95 wt.-% fiber and about 95 to 5 wt.-% particle or fiber or about 30 to 75 wt.-% particle or fiber and about 70 to 25 wt.-% super absorbent particulate or fiber occupies about 0.1 to 50 vol % of the layer or about 1 to 50 vol % or 2 to 50 vol % of the layer. The overall solidity (including the contribution of the active or inactive particulate) of the media is about 0.1 to about 50%, preferably about 1 to about 30%. The solidity of the web without including the contribution of the particulate in the structure is about 10 to about 80%. The filter media of the invention can attain a filtration efficiency of about 20 to about 99.9999% when measured according to ASTM-1215-89, with 0.78μ monodisperse polystyrene spherical particles, at 13.21 fpm (4 meters/min) as described herein. When used in HEPA type application, the filter performance is about 99.97% efficiency at 10.5 fpm and 0.3 micron NaCl or DOP particle size. Efficiency numbers in respect to this type of efficiency testing (0.3 micron DOP at 10.5 fpm test velocity), yield an efficiency in the range of 20 to 99.9999%

The Figure of Merit can range from 10 to $10^5$. The filtration web of the invention typically exhibits a Frazier permeability test that would exhibit a permeability of at least about 1 meters-minutes$^{-1}$, preferably about 5 to about 50 meters-minutes$^{-1}$ When used as a inactive particulate or separation means, the particulate that characterizes the particulate phase of the web of the invention is a particulate that is either inert to the mobile phase and the entrained contaminant load or has some defined activity with respect to the mobile fluid or the load.

The nanofiber layers of the invention typically range from about 0.5 to about 300 microns, 1 to about 250 microns or 2 to about 200 microns in thickness and contain within the layer about 0.1 to about 50 or 10 to about 50 vol % of the layer in the form of both inert (if any) and the super absorbent particulate or fiber of the invention. In this case, the super absorbent particulate or fiber or active particulate of the invention can be combined with inert spacer particulate in some amount. The active particulate of the invention acting to absorb, adsorb or react with contaminants within the fluid flow while the inert particulate simply provides an excluded volume within the layer to reduce solidity, improve efficiency and other filtration properties.

The creation of low pressure drop active particulate, chemically reactive, absorptive, or adsorptive substrates for the removal of gas phase contaminants from airstreams is from flat sheet rolls of absorptive/adsorptive/reactive media that are layered or rolled together with a spacer media to form an adsorptive/reactive substrate with open channels and absorptive/adsorptive/reactive walls. Additionally, the spacer media can be made to be absorptive/adsorptive/reactive so as to contribute to the overall life/performance of the final chemical unit. The spacer media that creates the open channels can be created from a mesh, single lines of a polymer bead, glue dots, metal ribs, corrugated wire/polymer/paper mesh, corrugated metal/paper/polymer sheets, strips of polymer, strips of adhesive, strips of metal, strips of ceramic, strips of paper, or even from dimples placed in the media surface. These spacer media can be made absorptive/adsorptive/reactive by coating them or extruding/forming them with/from absorptive/adsorptive/reactive materials. The contaminated airflow is primarily directed along the channel created by the spacer media. This air comes into contact with the adsorptive/reactive media walls and/or spacer media and subsequently becomes adsorbed or reacted. The channel size and shape is controlled by the shape and size of the space media. Examples include squares, rectangles, triangles, and obscure shapes that may be created by a dotted pattern of polymer/adhesive. The chemistry of the walls and spacer media can be made specific to adsorb acidic, basic, and organic and water vapors, as well as several specific classes of compounds including reactive carbonyl compounds, including formaldehyde, acetaldehyde and acetone.

The super absorbent particulate or fiber can be held together with adhesive or fibers to encapsulate, or simply hold, the particles and/or additional scrim materials are attached to hold the reactive material in place and minimize shedding of particles. The super absorbent particulate or fiber can also be sandwiched between layers of scrim. The scrim could help to produce the channels or space between the layers. This could be accomplished with a high loft scrim material that would give the proper spacing as well as ability to hold super absorbent particulate or fiber in the media. The super absorbent particulate or fiber can be held together or interspersed with fibers.

Secondary fibers can be used to make useful layers or combined with super-absorbent fibers to provide specific materials of the invention. Secondary fibers can be used for a variety of reasons such as, but not limited to, lowering the cost of the final products, increasing their wet and dry strength, and increasing their ability to prevent migration of wet superabsorbent material. Secondary fibers can be staple monocomponent fibers and/or staple bicomponent fibers. Examples of monocomponent fibers include, but are not limited to, polyethylene (PE), polypropylene (PP), polystyrene (PS), nylon-6, nylon-6,6, nylon12, copolyamides, polyethylene terephthalate (PET), polybutylene terephthalate (PBT), copolyester (CoPET), and cellulose based fibers, such as rayon and Tencel. Examples of suitable bicomponent fibers include, but are not limited to, PE/PET, PP/PET, CoPET/PET, PE/Nylon, PP/Nylon, Nylon-6,6/Nylon-6.

Polymer materials that can be used as the nanofiber polymer compositions of the invention include both addition polymer and condensation polymer materials such as polyolefin, polyacetal, polyamide, polyester, cellulose ether and ester, polyalkylene sulfide, polyarylene oxide, polysulfone, modified polysulfone polymers and mixtures thereof. Preferred materials that fall within these generic classes include polyethylene, polypropylene, poly(vinylchloride), polymethylmethacrylate (and other acrylic resins), polystyrene, and copolymers thereof (including ABA type block copolymers), poly(vinylidene fluoride), poly(vinylidene chloride), polyvinylalcohol in various degrees of hydrolysis (80% to 99.5%) in crosslinked and non-crosslinked forms. Preferred addition polymers tend to be glassy (a Tg greater than room temperature). This is the case for polyvinylchloride and polymethylmethacrylate, polystyrene polymer compositions or alloys or low in crystallinity for polyvinylidene fluoride and polyvinylalcohol materials. One class of polyamide condensation polymers are nylon materials. The term "nylon" is a generic name for all long chain synthetic polyamides. Typically, nylon nomenclature includes a series of numbers such as in nylon-6,6 which indicates that the starting materials are a $C_6$ diamine and a $C_6$ diacid (the first digit indicating a $C_6$ diamine and the second digit indicating a $C_6$ dicarboxylic acid compound). Nylon can be made by the polycondensation of ε-caprolactam in the presence of a small amount of water. This reaction forms a nylon-6 (made from a cyclic lactam—also known as ε-aminocaproic acid) that is a linear polyamide. Further, nylon copolymers are also contemplated. Copolymers can be made by combining various diamine compounds, various diacid compounds and various cyclic lactam structures in a reaction mixture and then forming the nylon with randomly positioned monomeric materials in a polyamide structure. For example, a nylon 6,6-6,10 material is a nylon manufactured from hexamethylene diamine and a $C_6$ and a $C_{10}$ blend of diacids. A nylon 6,6-6,6,10 is a nylon manufactured by copolymerization of ε-aminocaproic acid, hexamethylene diamine and a blend of a $C_6$ and a $C_{10}$ diacid material.

Block copolymers are also useful in the process of this invention. With such copolymers the choice of solvent swelling agent is important. The selected solvent is such that both blocks were soluble in the solvent. One example is a ABA (styrene-EP-styrene) or AB (styrene-EP) polymer in methylene chloride solvent. If one component is not soluble in the solvent, it will form a gel. Examples of such block copolymers are Kraton® type of styrene-b-butadiene and styrene-b-hydrogenated butadiene(ethylene propylene), Pebax® type of E-caprolactam-b-ethylene oxide, Sympatex® polyester-b-ethylene oxide and polyurethanes of ethylene oxide and isocyanates.

Addition polymers like polyvinylidene fluoride, syndiotactic polystyrene, copolymer of vinylidene fluoride and hexafluoropropylene, polyvinyl alcohol, polyvinyl acetate, amorphous addition polymers, such as poly(acrylonitrile) and its copolymers with acrylic acid and methacrylates, polystyrene, poly(vinyl chloride) and its various copolymers, poly (methyl methacrylate) and its various copolymers, can be solution spun with relative ease because they are soluble at low pressures and temperatures. However, highly crystalline polymer like polyethylene and polypropylene require high temperature, high pressure solvent if they are to be solution spun. Therefore, solution spinning of the polyethylene and polypropylene is very difficult. Electrostatic solution spinning is one method of making nanofibers and microfiber.

The polyurethane (PU) polyether used in this layer of invention can be an aliphatic or aromatic polyurethane depending on the isocyanate used and can be a polyether polyurethane or a polyester polyurethane. A polyether urethane having good physical properties can be prepared by melt polymerization of a hydroxyl-terminated polyether or polyester intermediate and a chain extender with an aliphatic or aromatic (MDI) diisocyanate. The hydroxyl-terminated polyether has alkylene oxide repeat units containing from 2 to 10 carbon atoms and has a weight average molecular weight of at least 1000. The chain extender is a substantially non-branched glycol having 2 to 20 carbon atoms. The amount of the chain extender is from 0.5 to less than 2 mole per mole of hydroxyl terminated polyether. It is preferred that the polyether polyurethane is thermoplastic and has a melting point of about 140° C. to 250° C. or greater (e.g., 150° C. to 250° C.) with 180° C. or greater being preferred.

In a first mode, the polyurethane polymer of the invention can be made simply by combining a di-, tri- or higher functionality aromatic or aliphatic isocyanate compound with a polyol compound that can comprise either a polyester polyol or a polyether polyol. The reaction between the active hydrogen atoms in the polyol with the isocyanate groups forms the addition polyurethane polymer material in a straight forward fashion. The OH:NCO ratio is typically about 1:1 leaving little or no unreacted isocyanate in the finished polymer. In any unreacted isocyanate compound, reactivity can be scavenged using isocyanate reactive compounds. In a second mode, the polyurethane polymer can be synthesized in a stepwise fashion from isocyanate terminated prepolymer materials. The polyurethane can be made from an isocyanate-terminated polyether or polyester. An isocyanate-capped polyol prepolymer can be chain-extended with an aromatic or aliphatic dihydroxy compound. The term "isocyanate-terminated polyether or polyurethane" refers generally to a prepolymer which comprises a polyol that has been reacted with a diisocyanate compound (i.e., a compound containing at least two isocyanate (—NCO) groups). In preferred form, the prepolymer has a functionality of 2.0 or greater, an average molecular weight of about 250 to 10,000 or 600-5000, and is prepared so as to contain substantially no unreacted monomeric isocyanate compound. The term "unreacted isocyanate compound" refers to free monomeric aliphatic or aromatic isocyanate-containing compound, i.e., diisocyanate compound which is employed as a starting material in connection with the preparation of the prepolymer and which remains unreacted in the prepolymer composition.

The term "polyol" as used herein, generally refers to a polymeric compound having more than one hydroxy (—OH) group, preferably an aliphatic polymeric (polyether or polyester) compound which is terminated at each end with a hydroxy group. The chain-lengthening agents are difunctional and/or trifunctional compounds having molecular weights of from 62 to 500 preferably aliphatic diols having from 2 to 14 carbon atoms, such as, for example, ethanediol, 1,6-hexanediol, diethylene glycol, dipropylene glycol and, especially, 1,4-butanediol. Also suitable, however, are diesters of terephthalic acid with glycols having from 2 to 4 carbon atoms, such as, for example, terephthalic acid bis-ethylene glycol or 1,4-butanediol, hydroxy alkylene ethers of hydroquinone, such as, for example, 1,4-di(B-hydroxyethyl)-hydroquinone, (cyclo)aliphatic diamines, such as, for example, isophorone-diamine, ethylenediamine, 1,2-, 1,3-propylene-diamine, N-methyl-1,3-propylene-diamine, N,N'-dimethyl-ethylene-diamine, and aromatic diamines, such as, for example, 2,4- and 2,6-toluoylene-diamine, 3,5-diethyl-2,4- and/or -2,6-toluoylene-diamine, and primary ortho- di-, tri- and/or tetra-alkyl-substituted 4,4'-diaminodiphenyl-methanes. It is also possible to use mixtures of the above-mentioned chain-lengthening agents. Preferred polyols are polyesters, polyethers, polycarbonates or a mixture thereof. A wide variety of polyol compounds is available for use in the preparation of the prepolymer. In preferred embodiments, the polyol may comprise a polymeric diol including, for example, polyether diols and polyester diols and mixtures or copolymers thereof. Preferred polymeric diols are polyether diols, with polyalkylene ether diols being more preferred. Exemplary polyalkylene polyether diols include, for example, polyethylene ether glycol, polypropylene ether glycol, polytetramethylene ether glycol (PTMEG) and polyhexamethylene ether glycol and mixtures or copolymers thereof. Preferred among these polyalkylene ether diols is PTMEG. Preferred among the polyester diols are, for example, polybutylene adipate glycol and polyethylene adipate glycol and mixtures or copolymers thereof. Other polyether polyols may be prepared by reacting one or more alkylene oxides having from 2 to 4 carbon atoms in the alkylene radical with a starter molecule containing two active hydrogen atoms bonded therein. The following may be mentioned as examples of alkylene oxides: ethylene oxide, 1,2-propylene oxide, epichlorohydrin and 1,2- and 2,3-butylene oxide. Preference is given to the use of ethylene oxide, propylene oxide and mixtures of 1,2-propylene oxide and ethylene oxide. The alkylene oxides may be used individually, alternately in succession, or in the form of mixtures. Starter molecules include, for example: water, amino alcohols, such as N-alkyldiethanolamines, for example N-methyl-diethanolamine, and diols, such as ethylene glycol, 1,3-propylene glycol, 1,4-butanediol and 1,6-hexanediol. It is also possible to use mixtures of starter molecules. Suitable polyether polyols are also the hydroxyl-group-containing polymerization products of tetrahydrofuran.

Suitable polyester polyols may be prepared, for example, from dicarboxylic acids having from 2 to 12 carbon atoms, preferably from 4 to 6 carbon atoms, and polyhydric alcohols. Suitable dicarboxylic acids include, for example: aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids may be used individually or in the form of mixtures, for example in the form of a succinic, glutaric and adipic acid mixture. It may be advantageous for the preparation of the polyester polyols to use, instead of the dicarboxylic acids, the corresponding dicarboxylic acid derivatives, such as carboxylic acid diesters having from 1 to 4 carbon atoms in the alcohol radical, carboxylic acid anhydrides or carboxylic acid chlorides. Examples of polyhydric alcohols are glycols having from 2 to 10, preferably from 2 to 6, carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol. According to the desired properties, the polyhydric alcohols may be used alone or, optionally, in admixture with one another. Also suitable are esters of carbonic acid with the mentioned diols, especially those having from 4 to 6 carbon atoms, such as 1,4-butanediol and/or 1,6-hexanediol, condensation products of (omega-hydroxycarboxylic acids, for example (omega-hydroxycaproic acid, and preferably polymerization products of lactones, for example optionally substituted (ε-caprolactones. These are preferably used as polyester polyols ethanediol polyadipate, 1,4-butanediol polyadipate, ethanediol-1,4-butanediol polyadipate, 1,6-hexanediol neopentyl glycol polyadipate, 1,6-hexanediol-1,4-butanediol polyadipate and polycaprolactones. The polyester polyols have molecular weights of from 600 to 5000.

The number of average molecular weight of the polyols from which the polymer or prepolymers may be derived may range from about 800 to about 3500 and all combinations and subcombinations of ranges therein. More preferably, the number of average molecular weights of the polyol may range from about 1500 to about 2500, with number average molecular weights of about 2000 being even more preferred.

The polyol in the prepolymers can be capped with an isocyanate compound or can be fully reacted to the thermoplastic polyurethane (TPU). A wide variety of diisocyanate compounds is available for use in the preparation of the prepolymers of the present invention. Generally speaking, the diisocyanate compound may be aromatic or aliphatic, with aromatic diisocyanate compounds being preferred. Included among the suitable organic diisocyanates are, for example, aliphatic, cycloaliphatic, araliphatic, heterocyclic and aromatic diisocyanates. Examples of suitable aromatic diisocyanate compounds include diphenylmethane diisocyanate, xylene diisocyanate, toluene diisocyanate, phenylene diisocyanate, and naphthalene diisocyanate and mixtures thereof. Examples of suitable aliphatic diisocyanate compounds include dicyclohexylmethane diisocyanate and hexamethylene diisocyanate and mixtures thereof. Preferred among the diisocyanate compounds is MDI due, at least in part, to its general commercial availability and high degree of safety, as well as its generally desirable reactivity with chain extenders (discussed more fully hereinafter). Other diisocyanate compounds, in addition to those exemplified above, would be readily apparent to one of ordinary skill in the art, once armed with the present disclosure. The following may be mentioned as specific examples: aliphatic diisocyanates, such as hexamethylene diisocyanate, cycloaliphatic diisocyanates, such as isophorone diisocyanate, 1,4-cyclohexane diisocyanate, 1-methyl-2,4- and -2,6-cyclohexane diisocyanate and the corresponding isomeric mixtures, 4,4'-, 2,4'- and 2,2'-dicyclohexylmethane diisocyanate and the corresponding isomeric mixtures, and, preferably, aromatic diisocyanates, such as 2,4-toluoylene diisocyanate, mixtures of 2,4- and 2,6-toluoylene diisocyanate, 4,4'-, 2,4'- and 2,2'-diphenylmethane diisocyanate, mixtures of 2,4'- and 4,4'-diphenylmethane diisocyanate, urethane-modified liquid 4,4'- and/or 2,4'-diphenylmethane diisocyanates, 4,4'-diisocyanatodiphenylethane-(1,2) and 1,5-naphthylene diisocyanate. Preference is given to the use of 1,6-hexamethylene diisocyanate, isophorone diisocyanate, dicyclohexylmethane diisocyanate, diphenylmethane diisocyanate isomeric mixtures having a 4,4'-diphenylmethane diisocyanate content of greater than 96 wt. %, and especially 4,4'-diphenylmethane diisocyanate and 1,5-naphthylene diisocyanate.

For the preparation of the TPUs, the chain-extension components are reacted, optionally in the presence of catalysts, auxiliary substances and/or additives, in such amounts that the equivalence ratio of NCO groups to the sum of all the NCO-reactive groups, especially of the OH groups of the low molecular weight diols/triols and polyols, is from 0.9:1.0 to 1.2:1.0, preferably from 0.95:1.0 to 1.10:1.0. Suitable catalysts, which in particular accelerate the reaction between the NCO groups of the diisocyanates and the hydroxyl groups of the diol components, are the conventional tertiary amines known in the prior art, such as, for example, triethylamine, dimethylcyclohexylamine, N-methylmorpholine, N,N'-dimethyl-piperazine, 2-(dimethylaminoethoxy)-ethanol, diazabicyclo-(2,2,2)-octane and the like, as well as, especially, organometallic compounds such as titanic acid esters, iron compounds, tin compounds, for example tin diacetate, tin dioctate, tin dilaurate or the tindialkyl salts of aliphatic carboxylic acids, such as dibutyltin diacetate, dibutyltin dilaurate or the like. The catalysts are usually used in amounts of from 0.0005 to 0.1 part per 100 parts of polyhydroxy compound. In addition to catalysts, auxiliary substances and/or additives may also be incorporated into the chain-extension components. Examples which may be mentioned are lubricants, antiblocking agents, inhibitors, stabilizers against hydrolysis, light, heat and discoloration, flameproofing agents, colorings, pigments, inorganic and/or organic fillers and reinforcing agents. Reinforcing agents are especially fibrous reinforcing materials such as, for example, inorganic fibers, which are prepared according to the prior art and may also be provided with a size.

Further additional components that may be incorporated into the PU are thermoplastics, for example polycarbonates and acrylonitrile-butadiene-styrene terpolymers, especially ABS. Other elastomers, such as, for example, rubber, ethylene-vinyl acetate polymers, styrene-butadiene copolymers and other PUs, may likewise be used. Also suitable for incorporation are commercially available plasticisers such as, for example, phosphates, phthalates, adipates, sebacates. The PUs according to the invention are produced continuously. Either the known band process or the extruder process may be used. The components may be metered simultaneously, i.e. one shot, or in succession, i.e. by a prepolymer process. In that case, the prepolymer may be introduced either batchwise or continuously in the first part of the extruder, or it may be prepared in a separate prepolymer apparatus arranged upstream. The extruder process is preferably used, optionally in conjunction with a prepolymer reactor.

Fiber can be made by conventional methods and can be made by melt spinning the polyurethane PU or a mixed polyether urethane and the additive. Melt spinning is a well known process in which a polymer is melted by extrusion, passed through a spinning nozzle into air, solidified by cooling, and collected by winding the fibers on a collection device. Typically the fibers are melt-spun at a polymer temperature of about 150° C. to about 300° C.

Superabsorbent and other polymeric finer materials have been fabricated in non-woven and woven fabrics, fibers and microfibers. The polymeric material provides the physical properties required for product stability. These materials should not change significantly in dimension, suffer reduced molecular weight, become less flexible or subject to stress cracking, or physically deteriorate in the presence of sunlight, humidity, high temperatures or other negative environmental effects when used in manufacture. The invention relates to an improved polymeric material that can maintain physical properties in the face of incident electromagnetic radiation such as environmental light, heat, humidity and other physical challenges.

We have also found a substantial advantage to forming polymeric compositions comprising two or more polymeric materials in polymer admixture, alloy format, or in a crosslinked chemically bonded structure. We believe such polymer compositions improve physical properties by changing polymer attributes such as improving polymer chain flexibility or chain mobility, increasing overall molecular weight and providing reinforcement through the formation of networks of polymeric materials.

In one embodiment of this concept, two related or unrelated polymer materials can be blended for beneficial properties. For example, a high molecular weight polyvinylchloride can be blended with a low molecular weight polyvinylchloride. Similarly, a high molecular weight nylon material can be blended with a low molecular weight nylon material. Further, differing species of a general polymeric genus can be blended. For example, a high molecular weight styrene material can be blended with a low molecular weight, high impact polystyrene. A nylon-6 material can be blended with a nylon copolymer such as a nylon-6,6-6,6,10 copolymer. Further, a polyvinylalcohol having a low degree of hydrolysis such as an 80-87% hydrolyzed polyvinylalcohol can be blended with a fully or superhydrolyzed polyvinylalcohol having a degree of hydrolysis between 98 and 99.9% and higher. All of these materials in admixture can be crosslinked using appropriate crosslinking mechanisms. Nylons can be crosslinked using crosslinking agents that are reactive with the nitrogen atom in the amide linkage. Polyvinylalcohol materials can be crosslinked using hydroxyl reactive materials such as monoaldehydes, such as formaldehyde, ureas, melamine-formaldehyde resin and its analogues, boric acids and other inorganic compounds. dialdehydes, diacids, urethanes, epoxies and other known crosslinking agents. Crosslinking technology is a well known and understood phenomenon in which a crosslinking reagent reacts and forms covalent bonds between polymer chains to substantially improve molecular weight, chemical resistance, overall strength and resistance to mechanical degradation.

We have found that additive materials can significantly improve the properties of the polymer materials in the form of a nanofiber. The resistance to the effects of heat, humidity, impact, mechanical stress and other negative environmental effect can be substantially improved by the presence of additive materials. We have found that while processing the microfiber materials of the invention, the additive materials can improve the oleophobic character, the hydrophobic character, and can appear to aid in improving the chemical stability of the materials. We believe that the nanofibers of the invention in the form of a microfiber are improved by the presence of these oleophobic and hydrophobic additives as these additives form a protective layer coating, ablative surface or penetrate the surface to some depth to improve the nature of the polymeric material. We believe the important characteristics of these materials are the presence of a strongly hydrophobic group that can preferably also have oleophobic character. Strongly hydrophobic groups include fluorocarbon groups, hydrophobic hydrocarbon surfactants or blocks and substantially hydrocarbon oligomeric compositions. These materials are manufactured in compositions that have a portion of the molecule that tends to be compatible with the polymer material affording typically a physical bond or association with the polymer while the strongly hydrophobic or oleophobic group, as a result of the association of the additive with the polymer, forms a protective surface layer that resides on the surface or becomes alloyed with or mixed with the polymer surface layers. For 0.2-micron fiber with 10% additive level, the surface thickness is calculated to be around 50 Å, if the additive has migrated toward the surface. Migration is believed to occur due to the incompatible nature of the oleophobic or hydrophobic groups in the bulk material. A 50 Å thickness appears to be reasonable thickness for protective coating. For 0.05-micron diameter fiber, 50 Å thickness corresponds to 20% mass. For 2 microns thickness fiber, 50 Å thickness corresponds to 2% mass.

Preferably the additive materials are used at an amount of about 2 to 25 wt. %. Oligomeric additives that can be used in combination with the polymer materials of the invention include oligomers having a molecular weight of about 500 to about 5000, preferably about 500 to about 3000 including fluoro-chemicals, nonionic surfactants and low molecular weight resins or oligomers. Examples of useful phenolic additive materials include Enzo-BPA, Enzo-BPA/phenol, Enzo-TBP, Enzo-COP and other related phenolics were obtained from Enzymol International Inc., Columbus, Ohio.

An extremely wide variety of fibrous filter media exist for different applications. The durable nanofibers and microfibers described in this invention can be added to any of the media. The fibers described in this invention can also be used to substitute for fiber components of these existing media giving the significant advantage of improved performance (improved efficiency and/or reduced pressure drop) due to their small diameter, while exhibiting greater durability.

A media construction according to the present invention can include a first layer of permeable coarse fibrous media. A first layer of nanofiber with super absorbent particulate, fiber or fabric and optional particulate is secured to the first surface of the first layer of permeable coarse fibrous media. The nanofiber and the particulate, fiber or fabric layer can be formed simultaneously or separately. Preferably the first layer of permeable coarse fibrous material comprises fibers having an average diameter of at least 10 microns, typically and preferably about 12 (or 14) to 30 microns. The element of the invention, including the nanofiber and dispersed particulate layer can be combined with a variety of other layers as discussed elsewhere in the specification. The layers can be made as a flat or coplanar sheet version of the layers of the invention or can be pleated, corrugated or formed into virtually any other cross-sectional shape needed to form the low pressure drop flow through element of the invention; wherein selected ones of said pleats, corrugated layers or flutes being open at said first end portion and closed at said second end portion; and selected ones of said flutes being closed at said first end portion and open at said second end portion providing a fluid path through the fluted layer. The substrate can comprise an expanded PTFE layer or Teflon layer. The substrate can also be substantially free of a Teflon, an expanded PTFE layer. Such layers are useful in a variety of in use applications that can provide both filtration and activity from the active particulate. Such layers can also aid in confining the particulate into the element.

In preferred arrangements, the first layer of permeable coarse fibrous material comprises a material which, if evaluated separately from a remainder of the construction by the Frazier permeability test, would exhibit a permeability of at least 1 meter(s)/min, and typically and preferably about 2-900 meters/min. Herein when reference is made to efficiency, unless otherwise specified, reference is made to efficiency when measured according to ASTM-1215-89, with 0.78μ monodisperse polystyrene spherical particles, at 20 fpm (6.1 meters/min) as described herein.

A variety of methods can be utilized for the manufacture of nanofiber with the super absorbent particulate or fiber or other components. Chung et al., U.S. Pat. No. 6,743,273; Kahlbaugh et al., U.S. Pat. No. 5,423,892; McLead, U.S. Pat. No. 3,878,014; Barris, U.S. Pat. No. 4,650,506; Prentice, U.S. Pat. No. 3,676,242; Lohkamp et al., U.S. Pat. No. 3,841,953; and Butin et al., U.S. Pat. No. 3,849,241; all of which are incorporated by reference herein, disclose a variety of nanofiber technologies. The nanofiber of the invention is typically electrospun onto a substrate. The substrate can be a pervious or impervious material. In filtration applications non-woven filter media can be used as a substrate. In other applications the fiber can be spun onto an impervious layer and can be removed for down stream processing. In such an application, the fiber can be spun onto a metal drum or foil. The substrate can comprise an expanded PTFE layer or Teflon® layer. Such layers are useful in a variety of applications that can provide both filtration and activity from the active particulate.

The electrostatic spinning process can form the microfiber or nanofiber with super absorbent particulate or fiber. A suitable apparatus for forming the fiber is illustrated in Barris U.S. Pat. No. 4,650,506. This apparatus includes a reservoir in which the nanofiber forming polymer solution is contained, a pump and a rotary type emitting device or emitter to which the polymeric solution is pumped. The emitter generally consists of a rotating union, a rotating portion including a plurality of offset holes and a shaft connecting the forward facing portion and the rotating union. The rotating union provides for introduction of the polymer solution to the forward facing portion through the hollow shaft. Alternatively, the rotating portion can be immersed into a reservoir of polymer fed by reservoir and pump. The rotating portion then obtains polymer solution from the reservoir and as it rotates in the electrostatic field, the electrostatic field aligned toward the collecting media accelerates a droplet of the solution as discussed below.

Facing the emitter, but spaced apart therefrom, is a substantially planar grid 60 upon which the collecting media (i.e. substrate or combined substrate is positioned. Air can be drawn through the grid. The collecting media is passed around rollers which are positioned adjacent opposite ends of grid. A high voltage electrostatic potential is maintained between emitter and grid by means of a suitable electrostatic voltage source and connections and which connect respectively to the grid and emitter.

In use, the polymer solution with super absorbent particulate or fiber can be pumped to the rotating union or reservoir from reservoir. The forward facing portion rotates while liquid exits from holes, or is picked up from a reservoir, and moves from the outer edge of the emitter toward collecting media positioned on the grid. Specifically, the electrostatic potential between grid and the emitter imparts a charge to the material that cause liquid to be emitted there from as thin fibers which are drawn toward grid where they arrive and are collected on substrate or an efficiency layer. In the case of the polymer in solution, solvent is evaporated from the fibers during their flight to the grid; therefore, the fibers arrive at the substrate or efficiency layer without substantial solvent. The nanofibers bond to the substrate fibers first encountered at the grid. Electrostatic field strength is selected to ensure that as the polymer material it is accelerated from the emitter to the collecting media, the acceleration is sufficient to render the material into a very thin microfiber or nanofiber structure. Increasing or slowing the advance rate of the collecting media can deposit more or less emitted fibers on the forming media, thereby allowing control of the thickness of each layer deposited thereon. The rotating portion can have a variety of beneficial positions. The rotating portion can be placed in a plane of rotation such that the plane is perpendicular to the surface of the collecting media or positioned at any arbitrary angle. The rotating media can be positioned parallel to or slightly offset from parallel orientation.

A sheet-like substrate is unwound at a station. The sheet-like substrate is then directed to a splicing station wherein multiple lengths of the substrate can be spliced for continuous operation. The continuous length of sheet-like substrate is directed to a nanofiber technology station comprising the spinning technology discussed above, wherein a spinning device forms the nanofiber and lays the nanofiber in a filtering layer on the sheet-like substrate. After the nanofiber layer is formed on the sheet-like substrate in the formation zone, the nanofiber layer and substrate are directed to a heat treatment station for appropriate processing. The sheet-like substrate and nanofiber layer is then tested in an efficiency monitor and nipped if necessary at a nip station. The sheet-like substrate and fiber layer is then steered to the appropriate winding station to be wound onto the appropriate spindle for further processing.

The web, element or filter media of the invention when used in a filtration mode should have a minimal pressure drop for acceptable function as a filter and to obtain the activity of the super absorbent particulate or fiber or optional insert or active particle(s). Such pressure drop information is known for the types of filtration devices of the invention. Such pressure drop parameters define the useful life of the filtration element of the invention. The element of the invention, when used in a flow through mode with no intervening filter layer, should provide little or no resistance to the flow of the mobile fluid through the element (e.g.; less than 0.1 inches or less than 1-5 inches of water). Flow should not be constrained but the residence time, however, of the fluid within the element must be sufficient to obtain sufficient contact and absorbance/absorbance/reaction needed in the element to obtain the desired activity form the active particulate within the element. A useful residence time, depending on active particulate can be from about 0.01 to as long as it is necessary to obtain some removal of entrained materials. The residence time can be 0.02 second to as much as 5 minutes and typically ranges from about 0.01 to 60 seconds 0.01 to 1 second or as little as 0.02 to 0.5 second. The lifetime of such a unit is defined by the load of active particulate and the residual amount of activity in the unit. Some small amount of pressure drop can be designed into the element to slow the flow and extend residence time without substantially impeding flow.

There are two distinct mechanisms of capture of super absorbent particulate or fiber in the nanofiber matrix:

The web can be made by mechanical entanglement of the particles inside the nanofiber matrix that inhibit the particle or fiber from moving freely inside the composite. The result is a nanofiber network that acts much like a spider web, capturing and holding the particles on itself. As more layers are deposited, the network turns into a nanofibrous matrix of nanofiber and particles.

Adhesion between the particle or fiber and nanofibers as a direct result of solution spinning of the nanofibers. Because nanofibers were created from a polymer solution using electrospinning process, as the nanofibers land on the target, they may retain a very small amount of the solvent in their structure and hence they have the ability to fuse onto the super absorbent particulate or fiber.

Composites with even higher particulate efficiency can be made by several means:
  Increasing the thickness of the overall composite
  Keeping the thickness of the overall composite the same, however, adding high efficiency layer made of very fine (around 0.25 micron) nanofibers coated on the bottom and top of the nanofiber/activated carbon particle composite The second method is preferable, simply because it would allow keeping the chemi-adsorptive properties of the composite the same, while the particulate efficiency can be adjusted independently.

The application of this invention is to purify or separate fluid streams, such streams including liquid streams and gaseous streams. The filter element of the invention is placed in a location or environment suitable for a particular application, such that a contaminate-laded fluid stream can pass through or pass by the element, and contaminates can be removed. Fluid streams for the application include liquid or gaseous streams that can contain contaminates such as dust particulate, water, solvent residue, oil residue, mixed aqueous oil residue, harmful gases. Mobile liquid streams include fuels, oils, solvent streams, etc. The streams are contacted with the flow-through or flow-by structures of the invention to remove liquid or particulate contaminants, color forming species, and soluble impurities. The contaminates to be removed by application of the invention also include biological products such as, for example, prions, viruses, bacteria, spores, nucleic acids, other potentially harmful biological products or hazardous materials.

In one aspect, the filter element of the invention can be placed in a vent for an enclosure, such that the interior of the enclosure is maintained at substantially reduced moisture content with respect to the exterior of the enclosure, because the adsorbent media removes moisture from the interior of the enclosure. The enclosure in which the filter element is placed includes an enclosure containing an electronic circuit or device, wherein the electronic circuit or device includes, without limitation, an organic light emitting diode, a hard drive, a display, or some combination thereof. For example, the filter element of the invention can be used as a moisture-absorbing flexible display for an electronic device. The flexible display comprises a lighted display (including displays formed using light emitting diodes) combined with the filter element, which absorbs moisture from the environment or enclosure in which the flexible display is used. Other uses include in seals for bearings or hydraulic cylinders to protect from any ingress of water, fuel pumps filters to remove water when fueling vehicle, wet-dry capture for vacuums, sweepers, and scrubbers, crank-case ventilation to prevent plugging from condensed liquid, drying bulk oil and fuel storage tanks, inlet air filtration in gas turbine systems to prevent salt migration (in environments subjected to humid, salt-laden air), to protect electronic enclosures in equipment and aqueous—hydrocarbon separations for waste reduction.

Depending on the amount of performance necessary, this media could be used in various applications and in various forms including particle filtration and chemical filtration in the same layer or confined space, combination particle filter and chemical filter for use in a gas turbine application, chemical filter as the only option for gas turbine systems, high flow applications in the semiconductor industry for fan assemblies, point of use, and full filter fabrication locations or labs, applications that require a "gettering" type filter, point of use filtration for semiconductor within clean rooms with minimal space and maximum efficiency, tool mount filter for semiconductor applications within clean rooms with minimal space and maximum efficiency, high flow applications in ceiling grids for clean rooms applications, applications that require a reduced weight but similar efficiencies, applications that require a reduced pressure drop but similar efficiencies, locations requiring low particle shedding, or layers of chemical filters can be used. Respirators, dust masks, surgical masks and gowns, surgical drapes, HEPA replacement including filters for semiconductor processing equipment and clean rooms, sir filtration for gasoline, natural gas or diesel powered engine, inlet filtration for air compressors, inlet filtration for dust collection equipment, vacuum cleaner filters, acid gas removal from air, cartridges for dryers, CBRN protection materials, wound care, HVAC applications, cabin air filtration, room air cleaner, fuel filter, lube filter, oil filters, liquid filters, air filter for fuel cell application, process filters, insulation material, filters for disk drives, filters for electronics enclosures, chromatographic separations, bio-separations can all be made with the materials of the application. The materials of the invention can be used as a water separation structure that acts as a reservoir for water impurity.

The fiber structures of the invention can be used as flat or rolled media. By rolling or alternately stacking flat sheet chemical filtration with a spacing media, this can create flow channels within the element. These channels allow the gas fluid to be filtered to pass across the media in such a manner as to perform the desired reactions, while, at the same time, maintaining a lower pressure drop than the chemical filtration media would allow by itself. The spacing media may be chemically treated to assist in filtration or may be inert. Such flow channels in a filter element can be created by co-rolling the spacing media and chemical filtration media around a chemically active or inert core. Once the nanofiber layer containing super absorbent particulate or fiber, the active or active inert particulate of the invention is prepared, the layer must be mechanically assembled into a useful active or adsorbent or absorbent structure. Nanofiber layers are typically spun onto a substrate material which can be a scrim, a cellulosic substrate, a mixed synthetic cellulosic substrate or a purely cellulosic substrate. The nanofiber layers containing the super absorbent particulate or fiber or active or inert particulate are electrospun onto said substrates and the substrate can then be rolled into an absorbent structure. Alternatively, the layer can be cut into similar portions and stacked to form an absorbent layer. The internal structure of any assembly of the nanofiber layers has sufficient air flow to ensure that the air can pass easily through the assembly. In this case, the assembly would act, not as a filter, but purely as an absorbent assembly structure. In an alternative structure, the layers of nanofiber and reactive or active particulate can be assembled into a structure that filters and reacts, adsorbs, or absorbs. Such varying structures have applications in a variety of end uses. The former structure has little or no filtration properties and can remove reactive contaminant materials from fluid streams such as air streams or liquid streams simply using a flow-through mechanism. The latter structure can remove particulate, and can remove chemical species from a fluid such as air, simultaneously with the filtration operations.

In certain preferred arrangements of the wound or stacked layers of the invention, the media can be configured for a straight through flow either in a flow without filtration properties or a flow including passage through a filter layer. In such a fluid flow, the fluid will enter in one direction through a first flow face and exit moving in the same direction from a second flow face. Within the filter structure, the fluid may not interact with a surface that acts as a filter or it may interact with a flow, may contact a surface that obtains filtration properties. Generally, one preferred filter construction is a wound construction including a layer of media that is turned repeatedly about a center point forming a coil such that the filter media will be rolled, wound or coiled. One preferred useful structure is a corrugated structure in which the material has a fluted construction. Such flutes can be formed and combined with a face sheet. Once the corrugated media is combined with the uncorrugated media in the form of a face sheet, the resulting structure can be coiled and formed into a useful assembly. When using this type of media construction, the flutes form alternating peaks and troughs in the corrugated structure. In certain constructions, the upper flutes form flute chambers which can be closed at a downstream end while the flute chambers have upstream ends that are closed to form other rows of flutes. In such a structure, the opened and closed areas cause the fluid to pass through at least one corrugated wall to obtain filtration properties from the corrugated layer. In use, such corrugated media in a coiled assembly provides an intake area for a fluid stream such as air. Air enters a flute chamber in an open upstream end, the unfiltered fluid flow is not permitted to pass through a closed down stream end but is forced to proceed through a corrugated layer or fluted sheet to contact either the fiber of the corrugated layer or the active particulate to either filter particulate from the fluid stream, or to ensure that the material dispersed or dissolved in the fluid stream is reacted with, absorbed, or adsorbed onto the active particulate.

As discussed above, the nanofiber containing the super absorbent particulate or fiber or super absorbent fiber with optional particulate can be used to treat a mobile fluid phase such as a gas or liquid. The gas or liquid can be treated by the webs of the invention to interact with components of the mobile fluid phase. Components of the mobile fluid phase can be adsorbed or chemically reacted by the particulate in the web. Alternatively, the particulate in the web can be used to add back materials into the fluid stream in a reverse addition or controlled desorption mode. In such a mode, the particulate can be pretreated with a material such that in a flow by or flow through mode, the material in the particulate can be released or selectively desorbed into the mobile fluid.

Disc drive technology is demanding and requires maintaining operating parameters of temperature, pressure that leads to long operating life of the disk drive structure. Maintaining such an environment requires the filter structures that can be useful to exclude particulate from the described environment. Such filter designs are optimal with the pressure drop of the breather or filter structures low. Preferred disk drive filter breather filter structures can preferably include properties that result in little or no introduction of moisture into the disk drive environment or space within the disk drive housing. An optimum filter structure can permit the removal of moisture from the interior of the disk drive while permitting no entry of moisture as the disk drive structure cycles during heating and cooling obtaining in the operation of the disk drive. The disk drive breather or filter structure of the invention can optimize porous size and structure poor distribution, rigidity or flexibility of the breather filter material and appropriate surface energy to aid in moisture absorption from the ambient air.

Figure 5:
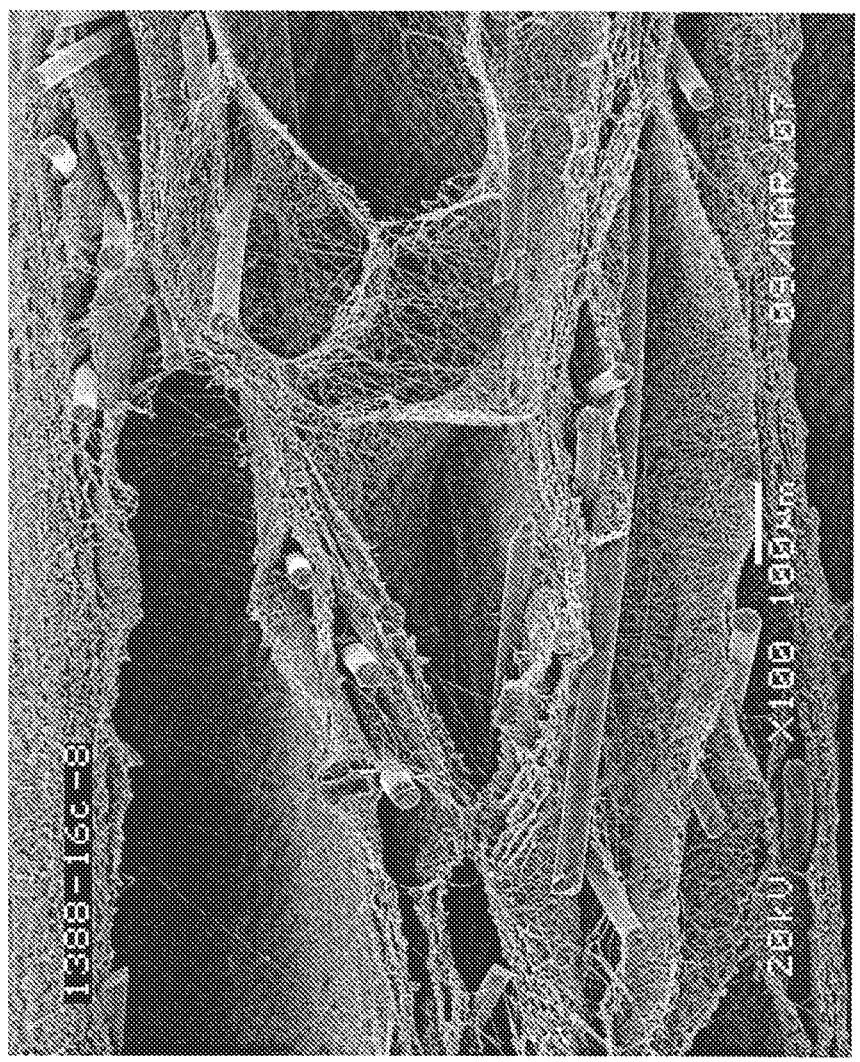

In one mode, the breather filter structure of the invention can work as a one way moisture transfer device. In such a mode, the breather filter structure can absorb moisture from the ambient air as the air enters the disk drive housing during normal operation conditions. However, the technology of the invention can also be used as a structure that at a minimum can absorb moisture as the ambient air is directed from the housing and as the ambient air is directed into the housing. The structure of FIG. 5 is one embodiment of a structure of the invention using two layers of filter materials that can contain either super absorbent particulate or fiber in the web or media of the invention.

The structures of the invention can also be used in separating entrained gases of a minor proportion in a gas stream. Such gas from gas separation can involve a structure of the invention wherein super absorbent fiber or super absorbent particulate can be used in a web for such separations. Very commonly intake air from a variety of industrial applications require that the intake air be dry, free of contaminants, such as dust, oil, urban aerosol pollution or other contaminants. Such contaminants can often interfere with the working mechanisms of the structure or can result in contamination of a product or product screen. One embodiment of technology of the invention can involve a reduced particle size particulate or reduced fiber diameter particle or fiber of the super absorbent material to improve absorption, a surface phenomenon. Such smaller fiber or particulate can improve the void volume of the packing, while at the same time, obtaining an interstitial velocity through the material lower than conventional designs to improve absorption efficiency. This improves efficiency of the material and pressure drop.

One particularly important application of this technology is the use of the technology in compressed air production. Compressed air is indispensable process medium for many industrial commercial applications. Clean, useful compressed air must be dry, free of oil particulate and other contaminates to avoid damage to the compressed air and to the usefulness of the resulting products made using the technology. Currently, absorbents used in compressed air involve very high pressure drops in normal operation a long time for regeneration and can cause introduction of harmful particles into the process equipment. A preferred compressed air dryer structures can include a super absorbent particle or a super absorbent fiber in a nanofiber matrix with optional absorbents/adsorbents or reactive structures. In these applications, the optional particulate can include zeolites, absorbent salts, such as lithium chloride and other materials. Alternatively, the dryer structures of the invention used in compressor applications can be made of a nanofiber layer containing a superabsorbent fiber within the nanofiber web or as a separate web or layer in the overall dryer structure.

In many technologies, water can be a contaminate in a variety of useful fluids. Typically, fluids in which water is substantially not soluble or omissible can accumulate a large proportion of contaminating water. Some water is dissolved or dispersed into the phase of the fluid; however, a large amount of water can also collect as a separate phase in contact with the fluids. In a number of industrial applications, the presence of water can be a problem including jet fuel, E85 fuel, and gasohol. The technology of the invention can be used to separate water from hydrocarbon liquid such as fuels, oils, and other materials prior to introduction of the material into a storage tank or vehicle tank. In such an application, the hydrocarbon stream is passed through a structure of the invention wherein the super absorbent fiber or particulate absorbs water from the hydrocarbon stream resulting in a clean, improved fuel. Also, in oil and fuel reservoirs, the structures of the invention can be used to remove contaminated water from storage facilities. Using such technologies, contaminating water can be kept at a concentration well below saturation point in the fuel or oil layer. Additionally, the separation of water from E85 or gasohol or other such ethanol containing fuels can also be obtained. Such a structure can be used as a continuous filter where in the contents of a reservoir is continuous passed through the filter thus removing water from the contents of the reservoir in a continuous operations mode. Alternatively, the structures of the invention can be inserted into the reservoirs at a low point in the tank where aqueous materials separating from the hydrocarbon liquid collect which can be absorbed by a removed from the tank. Alternately, when the hydrocarbon material is removed from the tank, the material can be passed through a high capacity structure of the invention to remove fuel when removed.

Aviation Fuse Filters can be regarded as the last resort at capturing water from getting into the fuel tank of an aircraft. These filters are designed to swell in the presence of water leading to a sharp increase in pressure drop, to which the fueling personnel responds by shutting off the flow. The swelling of the fuse filter takes place due to the presence of super absorbent polymer (SAP) particle or fiber dispersed between layers of synthetic scrims or tissue in general. SAP particle or fiber can absorb water very fast typically at very high masses compared to their original mass. They can hold the water for long periods of time and do not bleed the water out.

There are several important issues, which are equally important that one wants to avoid when dealing with these types of aviation fuse filters and fueling. One of such issues is the presence of water downstream from the fuse filter, which would eventually end up in the fuel tank of the aircraft. The water in the fuel tank and lines is absolutely unwanted since it can freeze up in the lines at high altitudes and sub-zero temperatures leading to a potential failure of the aircraft engine. The other key issue is migration of the SAP particles downstream into the fuel tank, which also is unwanted as they can lead up to the fouling of the jet engines.

There are several reasons why water and super absorbent particulate or fiber could penetrate downstream of the fuse filter and inside the fuel tank of the aircraft. One is more of an intrinsic property of the media as it can not swell-shut fast enough or not shut-off completely that in the presence of large enough quantities of water, the water penetrates downstream. In the case of super absorbent particulate or fiber migration downstream, the absolute glass media in the far downstream of the composite media, the glass is intended to capture any particle that becomes mobile enough to flow with the fuel. There are certain reasons why they can become mobile and migrate downstream: particles are typically not bound tightly inside the tissue or synthetic sheets; and that electrostatic discharges due to the flow of highly insulative jet fuel and composite media that has prone to triboelectric charging can be generated resulting in holes throughout the depth of the media which acts like leak paths for the SAP particles. Three existing commercially available aviation fuse filters were evaluated and used as benchmarks against the inventive designs created during the program. These three different elements were purchased commercially from three different suppliers.

An improved composite media for uses in aviation fuel monitoring serving as a fuse during fueling of aircraft is shown. It is designed to address two of the most critical aspects, which are presence of unwanted water and SAP particles inside the fuel tank of an aircraft that leads to the fouling of the fuse filters, discontinuation of the fueling and potential hazards associated by the presence of water and SAP particle inside the aircraft fuel tank. The structures of the invention can be used to minimize or eliminate the penetration of water downstream of the fuse filter, and minimize or eliminate the migration of SAP particles downstream of the fuse filter The structures of the invention can be used to obtain a quick shut-off of the fuse filter in the presence of water inside the fuel. The presence of water is indicated by a sharp increase in pressure drop across the filter. The structures of the convention can obtain control of SAP particle migration such as by eliminating the one-dimensional morphology of the particles that makes them more susceptible to migration by employing two-dimensional fibrous super absorbent fibers In order to accomplish these goals with in the framework of the advancements described above, both external and internal media possibilities are useful. Three of such aspects proved very suited for the application based on the experimental results which will be presented in the following sections. Super absorbent fibrous nonwoven media can be used. This particular super absorbent media is a relatively thick nonwoven composed of super absorbent particulate or fibers that are laid down in a lofty and open network leading up to desirable low pressure drop (high permeability). Dry material properties were assessed and compared using air permeability measurements. This particular super absorbent media came in with cellulose backing laminated to it by the supplier. During tests in-house the backing was removed by simply separating it from the super absorbent media. Nanofiber treatment of a super absorbent fibrous nonwoven media can be used. The nanofiber treated super absorbent nonwoven composite is based on the use of SAP particulate or a coating of the super absorbent material on a nonwoven media surface with a homogenous nanofiber network. The fibers are designed to be hydrophilic and elastic, which makes the composite wet evenly in the presence of water due the hydrophilic nature of the fibers. The fibers help transport water through capillary means and the elasticity of the fibers ensures that any small fragments of the super absorbent nonwoven even when wet, are tightly bounded even in the presence of water as the water causes the swelling of super absorbent fibers, which results in a significant increase in volume. Through their elastic properties, the fibers can manage the expansion of the super absorbent substrate fibers and the structure is held together as a solid composite, without super absorbent fiber migration out of the composite. In this configuration, nanofiber can be applied to the downstream of the super absorbent nonwoven media in order to facilitate the capturing of the wet super absorbent fibers. In other words, when this nanofiber network is applied to the upstream of the super absorbent nonwoven, it impacts the wetting character of the media, and when the nanofiber network is on the downstream side of the nonwoven, they facilitate the capture of any fugitive small fragments from the super absorbent nonwoven. In one or both modes of operation, the nanofiber provide an advantage over the untreated super absorbent nonwoven media.

In either mode of operation, the nanofiber can be applied onto other types of substrates i.e. scrims, glass etc. to serve the same desired functions. As long as these nanofiber are present either on the upstream and/or on the downstream side of the super absorbent nonwoven substrate, they will serve their purpose of aiding wetting on the upstream and capturing fugitive SAP fragments on the downstream of the super absorbent nonwoven media.

Figure 3A:
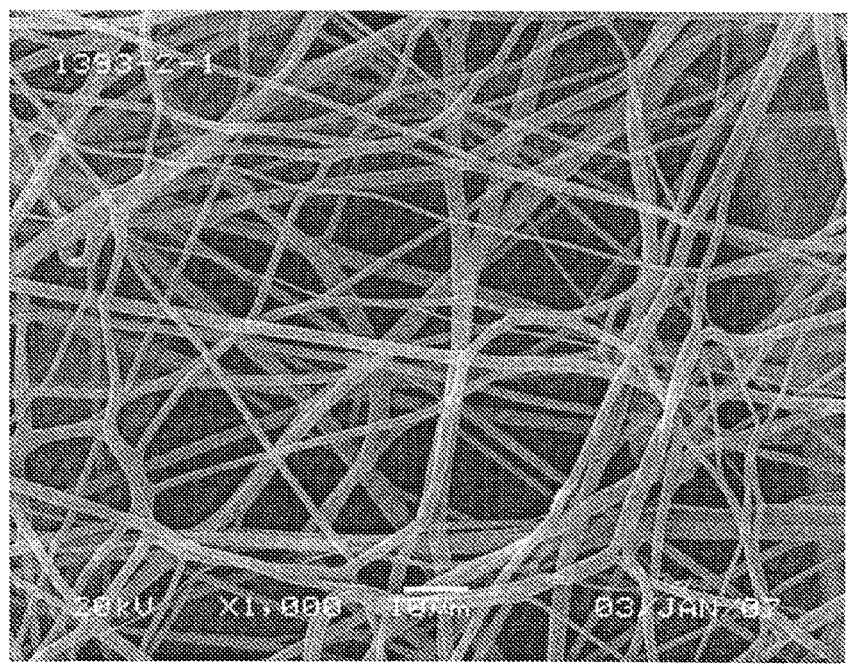
FIG. 3 shows the top and cross section views of a composite where nanofibers are used to treat the surface of a super absorbent nonwoven substrate
Figure 3B:
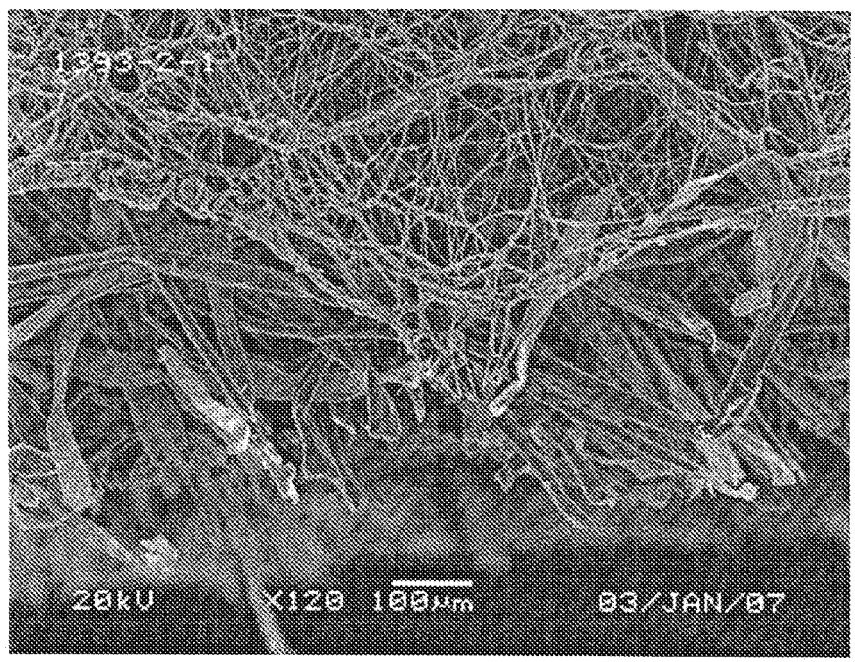
Figure 4A:
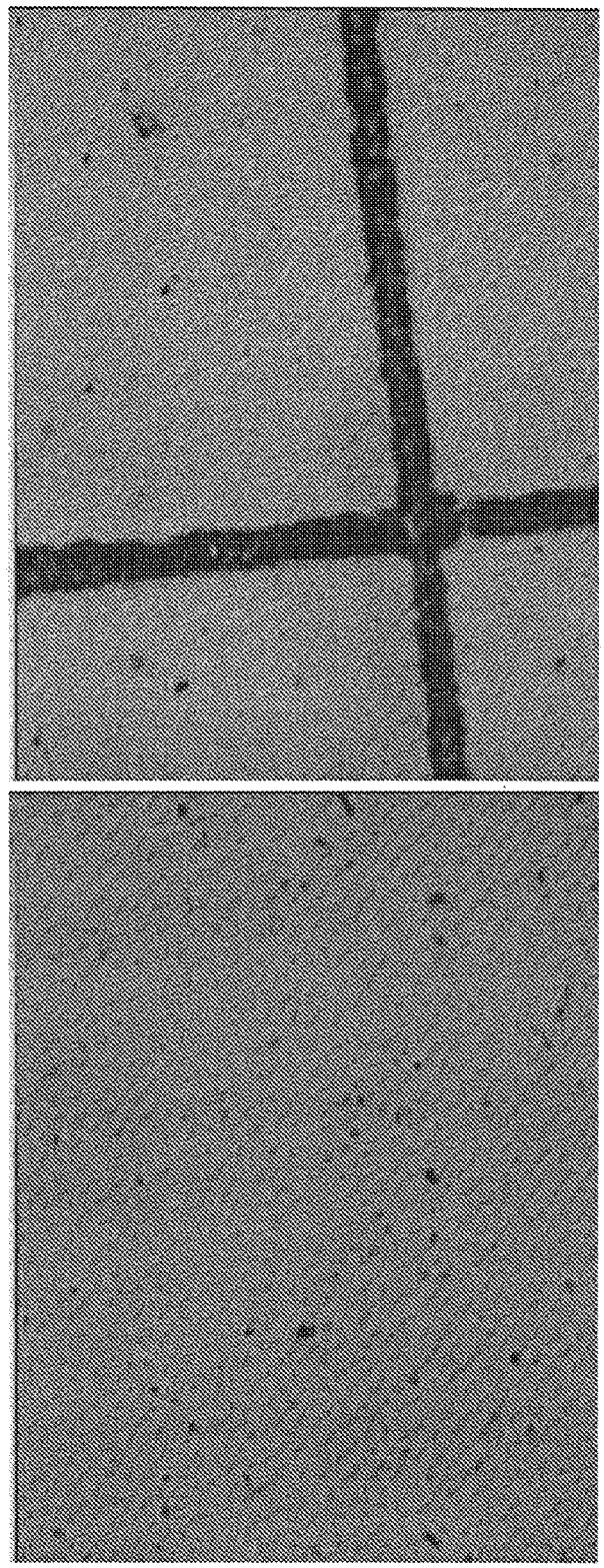
FIG. 4 shows the optical microscope images of copper sulfate stained membranes after effluent diesel has been filtered through them; residual blue stain is an indication of the presence of super absorbent particles FIG. 5 show the cross section view of a composite comprising a substantially continuous nanofiber mass containing super absorbent fibers
Figure 4B:
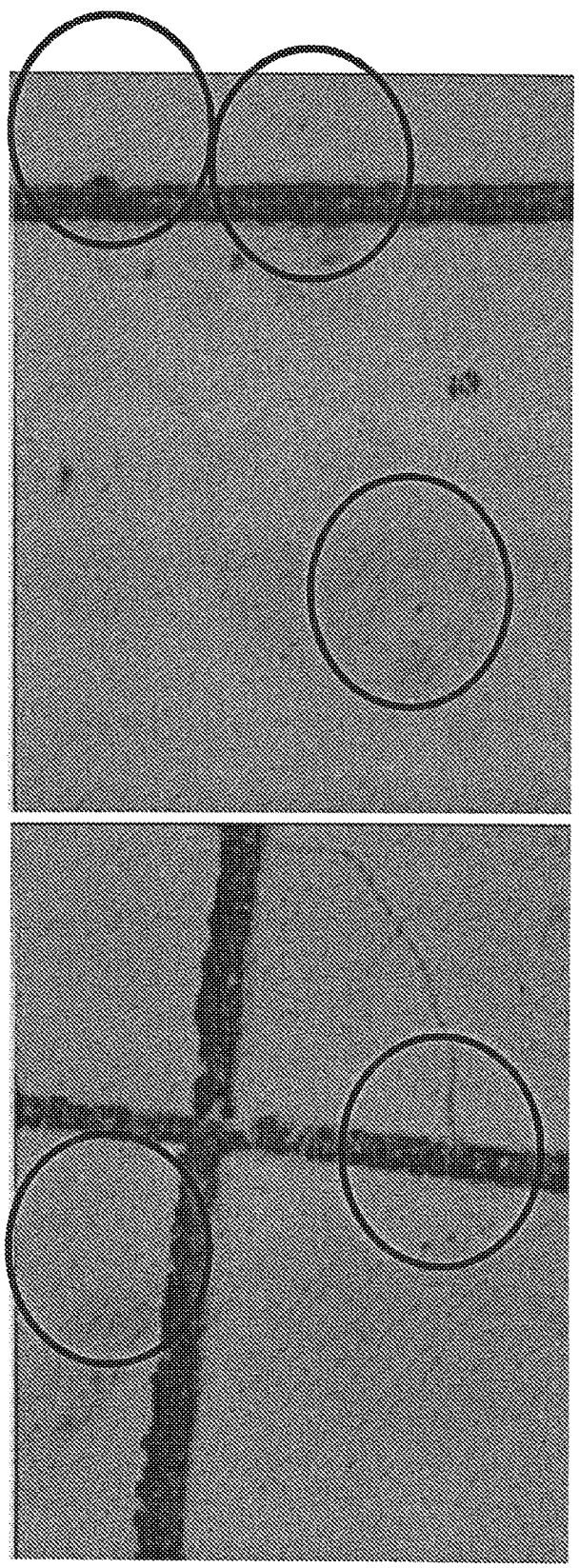
Figure 4C:
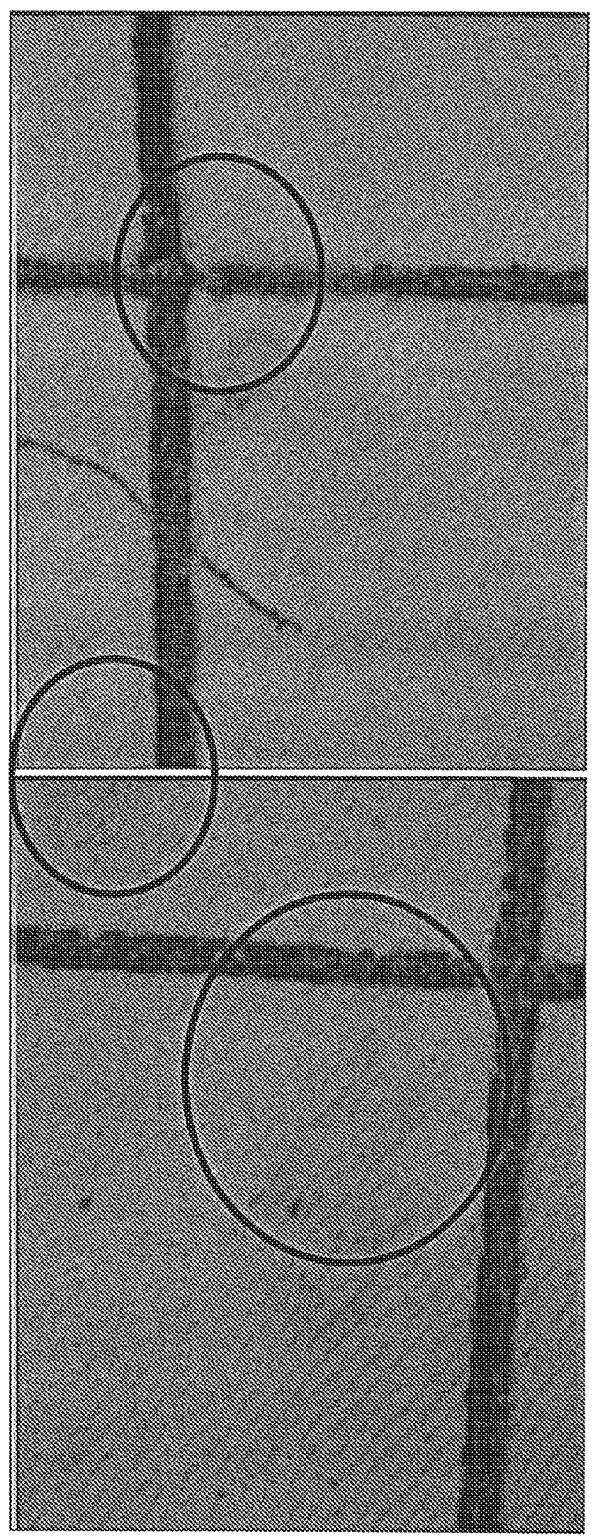

The nanofiber was generated by electrospinning fibers from thermoplastic polyurethane (grade SP-80A-150) obtained from Noveon, Inc. Nanofibers are laid on to the super absorbent substrate in a random network with a range of different fiber sizes visible. See, FIG. 3. As it is described through the use of examples, the invention makes use of the super absorbent nonwoven media and the nanofiber coated on one or both sides of the nonwoven by layering of their combinations and in combination with other layers such as coalescing media and glass media.

A nanofiber composite can be used. This composite is based on SAP particles or fiber dispersed inside a nanofiber network in a homogenous manner, where each particle or fiber is arrested by the presence of many fibers surrounding it. The fibers are designed to be hydrophilic and elastic, which makes the composite wet evenly in the presence of water due the hydrophilic nature of the fibers. The fibers help transport water through capillary means and the elasticity of the fibers ensures that the particles are tightly bounded even in the presence of water as the water causes the swelling of SAP particles and tremendous increase in volume. Through their elastic properties, the fibers can manage the expansion of particles and the structure is held together as a solid composite, without particle migration out of the composite.

Figure 2:
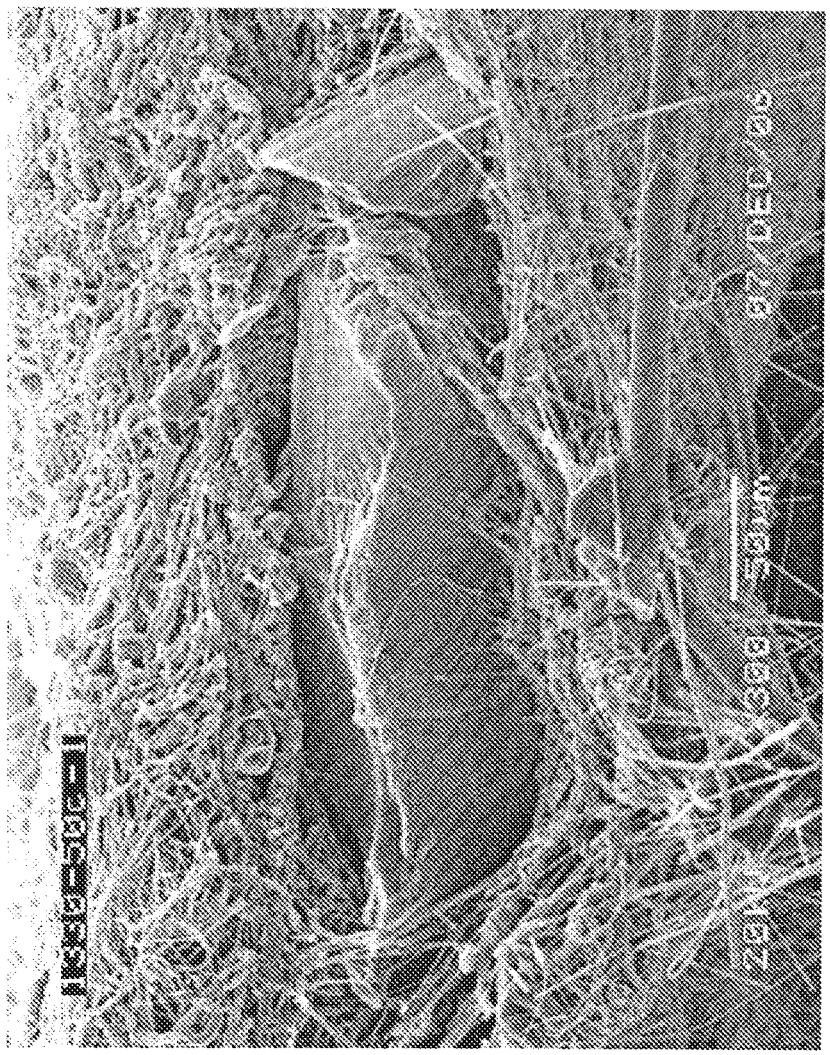
FIG. 2 shows a cross section view of a composite with a super absorbent particle trapped inside a nanofiber matrix

The nanofiber/SAP composite was generated by electrospinning fiber of thermoplastic polyurethane (grade SP-80A-150) obtained from Noveon, Inc. and incorporating SAP particles obtained from BASF, the trade name of the SAP particles were Luquasorb®-1010. For reference purposes a Scanning Electron Micrograph of the composite is presented in FIG. 2 below, where SAP particles can be seen within a network of nanofibers. Also visible in FIG. 2 is part of the 5 um Synteq XP glass media used as a substrate to facilitate the support function for nanofiber/SAP composite.

As it will be described in the following section through the use of examples, the invention makes use of these two highly water absorptive media by either themselves or by layering of their combinations and in combination with other layers such as coalescing media and glass media. It should be understood that this invention can also be used for other liquid or gas streams where a "fuse" is useful to shut off flow if excessive water is present. This could include other hydrocarbon fluids, other nonpolar or polar fluids, gas streams including air, natural gas, process gasses, etc at any operating pressure. Following tables depict some of the composite media that was assembled with the use of either the super absorbent fibrous nonwoven media alone or with the coatings of the nanofiber network on it or the nanofiber/super absorbent particulate or fiber or a combination of the two as seen in Examples 5 and 6. In all of these media, 5 um Synteq was used as the last layer (closest to the downstream) of the composite as an absolute filter to avoid the migration of SAP particles downstream, and a Reemay scrim was used as the top layer (closest to the upstream) as a protective sheet. In some of these examples, we have used a meltblown layer for water coalescing as well (examples 1, 3, 5, 6, 7 and 8). In some cases, the number of wraps of certain layers was changed as well, and they're noted on the tables below. For example, the difference between Examples 1 and 3 is the presence of an additional wrap of superabsorbent fibrous nonwoven media on Example 3.

In some of the examples presented here, a gradient 2 layer Bicomponent (Synteq XP) media was used to remove large particles. Also, in some of the composition, a meltblown media with 3 gradient layer structure was used for water coalescing.

| | # Wraps | Media Description | |
|---|---|---|---|
| | | Group 1 | |
| Example 1 | ~ | Reemay Scrim | Upstream |
| | 1 | Gradient 2 layer Synteq XP | ↓ |
| | 1 | Meltblown layer | Downstream |
| | 1 | Superabsorbent nonwoven | |
| | 2 | 5um Synteq XP | |
| Example 2 | ~ | Reemay Scrim | Upstream |
| | 1 | Gradient 2 layer Synteq XP | ↓ |
| | 1 | Superabsorbent nonwoven | Downstream |
| | 2 | 5um Synteq XP | |
| | | Group 2 | |
| Example 3 | ~ | Reemay Scrim | Upstream |
| | 1 | Gradient 2 layer Synteq XP | ↓ |
| | 1 | Meltblown layer | Downstream |
| | 2 | Superabsorbent nonwoven | |
| | 2 | 5um Synteq XP | |
| Example 4 | ~ | Reemay Scrim | Upstream |
| | 1 | Gradient 2 layer Synteq XP | ↓ |
| | 2 | Superabsorbent nonwoven | Downstream |
| | 2 | 5um Synteq XP | |
| Example 5 | ~ | Reemay Scrim | Upstream |
| | 1 | Gradient 2 layer Synteq XP | ↓ |
| | 1 | Meltblown layer | Downstream |
| | 1 | Nanofiber super absorbent particulate or fiber coating on Superabsorbent nonwoven | |
| | 1 | 5um Synteq XP | |
| Example 6 | ~ | Reemay Scrim | Upstream |
| | 1 | Gradient 2 layer Synteq XP | ↓ |
| | 1 | Meltblown layer | Downstream |
| | 1 | Superabsorbent nonwoven | |
| | 1 | 5um Synteq XP and Nanofiber/super absorbent particulate or fiber coating on 5um Synteq XP} | |
| | | Group 3 | |
| Example 7 | ~ | Reemay Scrim | Upstream |
| | 1 | Gradient 2 layer Synteq XP | ↓ |
| | 1 | Meltblown layer | Downstream |
| | 2 | Hydrophilic nanofiber coated Superabsorbent nonwoven and flipped which leads to (Nanofiber/SA fiber/SA fiber/Nanofiber layering) | |
| | 2 | 5um Synteq XP | |
| Example 8 | ~ | Reemay Scrim | Upstream |
| | 1 | Gradient 2 layer Synteq XP | ↓ |
| | 1 | Meltblown layer | Downstream |
| | 2 | Superabsorbent nonwoven | |
| | 2 | 5um Synteq XP | |
| | | Group 4 | |
| Example 9 | ~ | Reemay Scrim | Upstream |
| | 1 | Gradient 2 layer Synteq XP | ↓ |
| | 2 | Meltblown layer | Downstream |
| | 2 | 5um Synteq XP | |
| Example 10 | ~ | Reemay Scrim | Upstream |
| | 1 | Gradient 2 layer Synteq XP | ↓ |
| | 2 | Meltblown layer | Downstream |
| | 2 | 5um Synteq XP with nanofiber coating | |
| Example 11 | ~ | Reemay Scrim | Upstream |
| | 1 | Gradient 2 layer Synteq XP | ↓ |
| | 2 | Meltblown layer | Downstream |
| | 4 | 5um Synteq XP with nanofiber coating | |

The preferred Jet-A filter construction is layered as follows:

| | # Wraps | Name | Description | |
|---|---|---|---|---|
| | | | Group 5 | |
| Example 12 | | Scrim | Lightweight spunbond polyester | Upstream |
| | 1 | Synteq XP | Synthetic Depth Loading Liquid Media (basis weight 80 g/m$^2$, 0.35 mm thickness, approx. 30 μm filter rating) | ↓ Downstream |
| | 1 | Synteq XP | Synthetic Depth Loading Liquid Media (basis weight 60 g/m$^2$, 0.30 mm thickness, approx. 20 μm filter rating) | |
| | 1 | Meltblown | 3 Layer Gradient Composite Polyester Meltblown (basis weight 140 g/m$^2$, 0.55 mm thickness, approx. 10 μm filter rating) | |
| | 1 | Nanofiber | Electrospun polyurethane Nanofibers on Reemay #2014 scrim (LEFS Efficiency 99% @ 0.3 um 10.5 ft/min) | |
| | 1 | SAP | Concert Indristries DT325.100 airlaid grade w/ type 101 superabsorbent fibers from Technical Absorbents | |
| | 1 | Nanofiber | Electrospun polyurethane Nanofibers on Reemay #2014 scrim (LEFS Efficiency 99% @ 0.3um 10.5 ft/min) | |
| | 2 | Synteq XP | Synthetic Depth Loading Liquid Media (basis weight 40 g/m$^2$, 0.25 mm thickness, approx. 5 μm filter rating) | |

A Jet A1 Fuel Fuse Prototype was used in a Testing Protocol Using Diesel as Model Fuel. Elements were 5 inches long and ran at the same flux rate as the full scale elements are specified to be run at. Also, instead of the Jet A1 fuel, we have used diesel fuel as the model fuel. Based on the Interfacial Tension (IFT) and MSEP measurements of diesel and Jet A1 fuels, it is apparent that the emulsified water is harder to separate from diesel rather than Jet A1 since Jet A1 fuel has higher IFT and MSEP ratings than diesel fuel. And it is known in the emulsified water fuel separation field that higher IFT and MSEP leads to better separation efficiency. We have reported all the important properties of both the diesel (depending upon where it was purchased from, the properties vary) and the Jet A1 fuel. These properties were: density, surface tension, IFT and MSEP. In occasions where the diesel fuel properties varied significantly from one supplier to the other, we have included one of the baseline elements in the testing as a control test sample.

The Free Water Pressure Drop Test was used. Using new element saturated diesel fuel was pumped at 5 gpm. Water was introduced into the pump inlet at a rate to put 100 ppm free water by volume into the diesel. Feeding of 100 ppm water and diesel to the filter was continued until the pressure drop reached 50 psi. During the test, this procedure was followed and data collected which included recording of the pressure drop and temperature at start and approximately every 2 minutes, collecting effluent sample for diesel water content test until 50 psid was reached.

Figure 7:
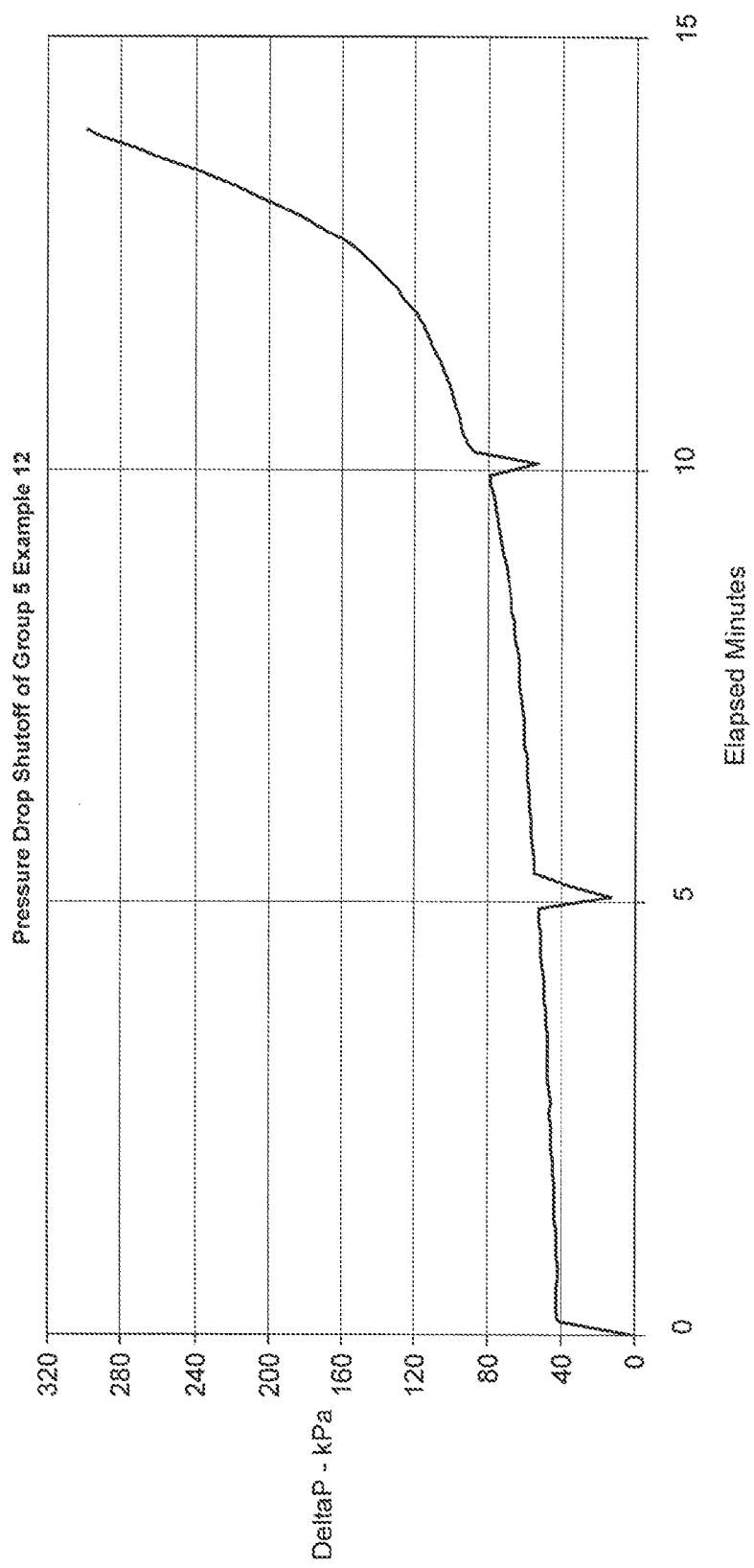

The Water Slug Test (test unit shown in FIG. 1) used in the testing uses a test system. The system was filled with water saturated diesel and circulated at 5 gpm. A water slug equal to the water absorbing capacity of the filter plus enough to fill the inlet plumbing and the filter housing (2 liters) was introduced at 5 gpm. The time it takes to reach 50 psi differential pressure was recorded and effluent sample for diesel/water ratio analysis was taken and measurements were conducted. Typical performance of the preferred design in Example 12 internal testing 100 ppm water addition test is shown in FIG. 7. Additional testing of DCI elements was conducted at South West Research institute with Jet A fuel and 50 ppm free water per the IP Draft Standard 1583 5$^{th}$ edition Qualification test 4.5.2. The data of FIG. 8 also demonstrates the quicker shut-off performance of the preferred DCI design in comparison to other competitor and DCI designs.

We also conducted testing for SAP migration. An element 5.75 inches long with layers outside to in of depth loading media, coalescer media, 2 layers of superabsorbent nonwoven and a double wrap of 5 um Synteq XP were constructed. As the comparison element, 5.75 inches long with layers outside to in of depth loading media, coalescer media, 2 layers of superabsorbent nonwoven and a double wrap of nanofiber layered on 5 um Synteq XP were constructed.

Testing was run in the standard rig under the same or similar conditions as previous testing. Each design was subjected to the saturated fuel recirculation test and was then run through the 100 ppm water pressure drop test. This was done to see if a difference could be noted in the water absorbing performance and SAP migration of a filter that had been through the recirculation test with and without nanofibers. The two-part testing was conducted as follows:

In a first test a saturated fuel recirculation test was used. Using a new element and saturated fuel with no additional free water, the fuel was circulated at 5 gpm and pressure drop was recorded for a total testing time of 20 min. Pressure drop, flow rate and temperature were recorded every 5 minutes. This testing was followed by the 100 ppm test on the used elements. As a second test a 100 ppm water pressure drop test was used.

Using the element from recirculation test, saturated diesel fuel was pumped at 5 gpm and water was introduced into the pump inlet at a rate to ensure the addition of 100 ppm free water by volume into the diesel. Effluent fuel sample was collected at 1 liter sample size for filtration through a 0.45 micron Millipore membrane for copper sulfate stain testing to detect super absorbent migration at the beginning and end of the test. Feeding of 100 ppm water and diesel to the filter was continued until the pressure drop reached 50 psi. During the test, pressure drop and temperature was recorded at the start and approximately every 2 minutes. Fuel water samples were analyzed with Karl Fischer Colorimetric unit for water content.

The following procedure was followed for the laboratory analysis of SAP migration on the effluent diesel filtered on membranes. After filtering the effluent fuel, the contaminant remained on the gridded membrane (grid markings facilitate the subsequent SAP particle counts in a statistically random way). The membrane was then wetted with 0.5% copper (II) sulfate solution for 2 minutes. The 0.5% copper (II) sulfate solution (w/v) was created using distilled water and copper (II) sulfate powder (99.99%). Excess copper sulfate solution was removed by vacuum filtration and the membrane was dried and then placed under a low power optical microscope and the membrane surface was examined for SAP particles. The presence of blue particles indicating the presence of SAP was noted and reported based on the counting of 20 grids on each membrane, where each counted grid was marked with a red ink pen to avoid re-counting of the same grid.

We also conducted testing for water absorbency of nanofiber. Using a new element and saturated fuel with the one time addition of 100 ppm free water, fuel was circulated at 5 gpm for 20 min. Pressure drop, flow rate, temperature and fuel saturation was recorded every 5 minutes. Fuel water samples were analyzed with Karl Fischer Colorimetric unit for water content. Two samples for each element configuration, examples 9, 10 and 11 were tested. The objective of this round of testing was to find whether hydrophilic nanofiber alone would aid in absorbing and removal of water from diesel fuel beyond its saturation level.

Experimental Results

All fuel water testing was performed on a KF 701 volumetric triton titrator. The two values for downstream PPM H2O represent the water concentration in the test fluid using either; beginning PPM of test fluid in bench subtracted by the measured PPM at the given test time), or measured PPM at given test time subtracted by the saturated value for the fluid. The beginning PPM for each test is reported on the very right column. Results are grouped in terms of the properties of the diesel fuel obtained from suppliers, as suppliers and the properties of the diesel fuel varied throughout the testing. Again, one point to keep in mind is that as IFT and MSEP values of the fluid increases, it becomes easier to separate emulsified water from the fluid.

Group 1

| Test Fluid Specifications | |
|---|---|
| Fluid Type | Super America - ULS Diesel (pump untreated) |
| Density | 0.843 mN/m |
| IFT | 22.2 mN/m |
| Surface Tension | 28.1 mN/m |
| MSEP Rating | 42.0 |
| Saturated PPM | 140 |

| | Test Time (min) | LPM Flow | Delta P (PSI) | Fluid Temp (° C.) | PPM H2O Downstream | PPM H2O Downstream (Saturated) | Diesel fuel water saturation at test start (ppm) |
|---|---|---|---|---|---|---|---|
| Baseline A | 0 | 16.0 | 8.00 | 23.9 | 0 | 22 | 162 |
| | 2 | 16.0 | 10.00 | 24.9 | 0 | 0 | |
| | 5 | 15.5 | 13.47 | 25.5 | 0 | 2 | |
| | 10 | 14.3 | 24.3 | 26.4 | 0 | 1 | |
| | 16 | 12.9 | 45.39 | 27.5 | 0 | 9 | |
| Baseline B | 0 | 16.5 | 5.74 | 26.9 | 0 | 9 | 149 |
| | 2 | 16.0 | 6.35 | 27.4 | 0 | 0 | |

-continued

|  |  |  |  |  |  |  |  |
|---|---|---|---|---|---|---|---|
|  | 5 | 16.0 | 7.09 | 27.7 | 0 | 0 |  |
|  | 17 | 14.0 | 24.6 | 29.6 | 0 | 6 |  |
|  | 20 | 12.5 | 44.90 | 29.5 | 6 | 15 |  |
| Baseline C | 0 | 16.0 | 8.43 | 26.3 | 0 | 15 | 155 |
|  | 2 | 15.5 | 12.74 | 27.1 | 0 | 0 |  |
|  | 4 | 14.0 | 20.12 | 27.6 | 0 | 0 |  |
|  | 9 | 12.3 | 43.03 | 28.6 | 0 | 0 |  |
| Example 1 | 0 | 16.5 | 5.3 | 24.9 | 0 | 0 | 127 |
|  | 2 | 16.5 | 6.88 | 25.1 | 0 | 0 |  |
|  | 5 | 16.3 | 9.18 | 25.6 | 0 | 0 |  |
|  | 14 | 13.0 | 43 | 26.9 | 14 | 1 |  |
| Example 2 | 0 | 17.0 | 2.61 | 27 | 0 | 0 | 138 |
|  | 2 | 17.0 | 2.76 | 27.2 | 0 | 0 |  |
|  | 5 | 17.0 | 2.98 | 27.5 | 0 | 0 |  |
|  | 15 | 16.8 | 9.79 | 28.4 | 29 | 27 |  |
|  | 17 | 12 | 43.16 | 28.8 | 42 | 40 |  |

Based on the results presented above for Group 1, it is apparent that the coalescing media (meltblown layer) made a difference in downstream water concentration since Example 1 has the coalescing layer and Example 2 does not have the coalescing layer. The downstream water concentration is greater in Example 2 compared to the Example 1. With the use of a coalescer, the very fine droplets were coalesced into larger droplets inside the fuel, which made the fuse filter more effective in terms of capturing and absorbing these water droplets by the superabsorbent fibrous nonwoven media.

In the presence of a coalescing media superabsorbent nonwoven along with other layers that goes into the element, performed very similar to the baseline media A, B and C. Any type of particle, fiber migration downstream is reduced significantly.

Group 2

As mentioned earlier, this diesel fuel was purchased from a different location and hence possessed different properties most notably IFT and MSEP. In fact, the diesel used for testing of Group 2 samples was harder to work with in terms of separation and absorption of the emulsified water from diesel fuel by superabsorbent fibers and particles.

Test Fluid Specifications

| Fluid Type | Holiday - ULS Diesel (pump untreated) |
|---|---|
| Density | 0.861 mN/m |
| IFT | 19.7 mN/m |
| Surface Tension | 28.8 mN/m |
| MSEP Rating | 0.0 |
| Saturated PPM | 161 |

|  | Test Time (min) | LPM Flow | Delta P (PSI) | Fluid Temp (° C.) | PPM H2O Downstream | PPM H2O Downstream (Saturated) | Diesel fuel water saturation at test start (ppm) |
|---|---|---|---|---|---|---|---|
| Baseline B | 0 | 16.0 | 7.03 | 25.8 | 0 | 2 | 163 |
|  | 2 | 16.0 | 8.04 | 26.4 | 0 | 0 |  |
|  | 5 | 16.0 | 10.09 | 27.0 | 0 | 0 |  |
|  | 11 | 15.5 | 15.92 | 27.9 | 46 | 48 |  |
|  | 15 | 15.0 | 23.47 | 28.6 | 35 | 37 |  |
|  | 20 | 13.0 | 43.17 | 29.6 | 48 | 50 |  |
| Example 3 | 0 | 16.5 | 4.48 | 26.8 | 0 | 0 | 147 |
|  | 2 | 16.5 | 4.72 | 27.2 | 0 | 0 |  |
|  | 5 | 16.5 | 5.01 | 27.6 | 0 | 0 |  |
|  | 11 | 16.5 | 7.30 | 28.5 | 30 | 16 |  |
|  | 13 | 15.0 | 11.50 | 28.8 | N/A | N/A |  |
|  | 16 | 13.0 | 40.00 | 29.1 | 132 | 113 |  |
| Example 4 | 0 | 16.5 | 3.18 | 27.2 | 0 | 0 | 154 |
|  | 2 | 16.5 | 3.44 | 27.7 | 0 | 0 |  |
|  | 5 | 16.5 | 3.62 | 27.9 | 0 | 0 |  |
|  | 11 | 16.5 | 5.41 | 28.7 | N/A | N/A |  |
|  | 15 | 13.0 | 44.32 | 29.2 | 59 | 52 |  |
| Example 5 | 0 | 16 | 8.5 | 24 | 0 | 0 | 142 |
|  | 2 | 16 | 9.22 | 24.6 | 0 | 0 |  |
|  | 5 | 15.5 | 16.72 | 25.3 | 0 | 0 |  |
|  | 8 | 12.5 | 41.78 | 25.7 | 15 | 1 |  |
| Example 6 | 0 | 16 | 8 | 25.3 | 0 | 0 | 152 |
|  | 2 | 16 | 9.63 | 25.8 | 0 | 0 |  |
|  | 5 | 15 | 21.16 | 26.2 | 0 | 0 |  |
|  | 7 | 12 | 43 | 26.8 | 0 | 0 |  |

The results from Group 2 reveal an improved media design as described. In terms of changes in water fuel separation as a function of fuel properties, one can compare the results between Baseline B from Group 1 and Group 2. The fuel used in Group 2 testing had a lower IFT and significantly lower MSEP compared to the fuel from Group 1. As a result of such difference, Baseline B performed poorly in Group 2 testing. Examples 3 and 4 performed similarly to that of Baseline B as all three samples allowed some amount of water penetrate downstream. Most notably, Examples 5 and 6 performed the best as they did not allow water to penetrate downstream, and the pressure drop increased at a steady rate. Looking back at the media design examples presented earlier, one can notice that the success of Examples 5 and 6 was in large part due to combination of superabsorbent nonwoven media working in tandem with the nanofiber super absorbent particulate or fiber composite media. Super absorbent media was an open and thick structure that resulted in good residence time of the fuel inside it. During the course of the testing, it absorbed much of the water and did not close off completely due to its open, lofty fibrous nature. Any water that was not absorbed by the superabsorbent nonwoven media was absorbed by the nanofiber/SAP particle composite positioned downstream of the superabsorbent nonwoven media. As most of the water was absorbed by the superabsorbent nonwoven, the composite did not prematurely shut-close due to the water in a short period of time. The quick absorption kinetics of the nanofiber/SAP particle composite did not allow water penetrating downstream of the element.

Group 3

Test Fluid Specifications

| Fluid Type | Super America - ULS Diesel (pump untreated) |
|---|---|
| Density | 0.854 mN/m |
| IFT | 20.5 mN/m |
| Surface Tension | 28.5 mN/m |
| MSEP Rating | 0.0 |
| Saturated PPM | 161 |

| | Test Time (min) | LPM Flow | Delta P (PSI) | Fluid Temp (° C.) | PPM H2O Downstream | PPM H2O Downstream (Saturated) | Diesel fuel water saturation at test start (ppm) |
|---|---|---|---|---|---|---|---|
| Example 7 | 0 | 16.3 | 6.72 | 27.2 | 0 | 0 | 145 |
| | 4 | 16.3 | 7.02 | 28.5 | 0 | 0 | |
| | 8 | 16.3 | 8.02 | 29.2 | 0 | 0 | |
| | 12 | 16.0 | 10.95 | 29.7 | 17 | 6 | |
| | 17 | 12.7 | 42.97 | 30.6 | 34 | 23 | |
| Example 8 | 0 | 16.3 | 6.31 | 29.7 | 0 | 23 | 161 |
| | 4 | 16.3 | 6.64 | 30.1 | 0 | 0 | |
| | 8 | 16.3 | 7.81 | 30.4 | 0 | 0 | |
| | 12 | 16.0 | 11.21 | 30.6 | 4 | 10 | |
| | 17 | 12.0 | 41.54 | 30.9 | 16 | 21 | |

The difference between examples 7 and 8 is that Example 8 has two superabsorbent nonwoven media face-to-face with coalescing media on one side and 5 um Synteq XP on the other side. On the other hand, Example 7 has the same two superabsorbent nonwoven media face-to-face configuration with the exception that there's hydrophilic nanofiber coating on both sides, sandwiching the two superabsorbent nonwoven media. The nanofiber coating on downstream swell in the presence of water and also acts as a barrier for any possible migration of swollen staple superabsorbent fibers, however based on the data shown for Examples 7 and 8, the water concentration downstream of the filters appear very similar. It is our understanding that the superabsorbent nonwoven media does most of the job in terms of removing water, which is resulting in a test with poor sensitivity in regards to nanofiber function. Therefore, follow-up testing that proves the effectiveness of hydrophilic nanofibers in absorbing/removing water has been carried out.

Group 4

Test Fluid Specifications

| Fluid Type | Super America - ULS Diesel (pump untreated) |
|---|---|
| Density | 0.845 mN/m |
| IFT | 19.7 mN/m |
| Surface Tension | 28.1 mN/m |
| MSEP Rating | 0.0 |
| Saturated PPM | 149 |

While primary purpose of using nanofibers on a superabsorbent nonwoven is to capture any possible SAP migration, the secondary purpose of the nanofibers is to absorb any excess water. During the testing where nanofibers were on the downstream side of the superabsorbent nonwoven, results showed no difference between the elements with and without nanofibers in terms of water content. In order to increase the sensitivity of the testing to the secondary function of nanofibers, superabsorbent nonwoven media was eliminated from the element configuration and water absorption was carried out only by the nanofiber layer.

| | Test Time (min) | LPM Flow | Delta P (PSI) | Fluid Temp (° C.) | PPM H2O Downstream | Diesel fuel water saturation at test start (ppm) |
|---|---|---|---|---|---|---|
| Example 9-1 | 0 | 16.3 | 5.88 | 23.3 | 139 | 149 |
| | 5 | 16.3 | 5.87 | 24.6 | 121 | |
| | 10 | 16.3 | 5.87 | 25.9 | 132 | |
| | 15 | 16.5 | 5.88 | 26.8 | 134 | |
| | 20 | 16.7 | 5.86 | 27.6 | 132 | |
| Example 9-2 | 0 | 16.2 | 5.51 | 26.6 | 152 | 149 |
| | 5 | 16.3 | 5.58 | 27.6 | 128 | |
| | 10 | 16.5 | 5.51 | 28.2 | 140 | |
| | 15 | 16.7 | 5.43 | 28.9 | 145 | |
| | 20 | 16.7 | 5.38 | 29.2 | 125 | |
| Example 10-1 | 0 | 16.8 | 5.59 | 27.1 | 161 | 149 |
| | 5 | 17.0 | 5.77 | 28.1 | 138 | |
| | 10 | 17.2 | 5.71 | 28.6 | 141 | |
| | 15 | 17.2 | 5.66 | 29.0 | 157 | |
| | 20 | 17.3 | 5.57 | 29.4 | 134 | |
| Example 10-2 | 0 | 17.0 | 5.57 | 28.3 | 170 | 149 |
| | 5 | 17.2 | 5.79 | 28.9 | 126 | |
| | 10 | 17.3 | 5.75 | 29.4 | 135 | |
| | 15 | 17.4 | 5.70 | 29.8 | 122 | |
| | 20 | 17.3 | 5.67 | 30.0 | 153 | |
| Example 11-1 | 0 | 16.1 | 5.85 | 23.6 | 150 | 149 |
| | 5 | 16.1 | 5.84 | 23.9 | 99 | |
| | 10 | 16.3 | 5.84 | 24.3 | 122 | |
| | 15 | 16.3 | 5.81 | 24.9 | 115 | |
| | 20 | 16.3 | 5.78 | 25.4 | 112 | |
| Example 11-2 | 0 | 16.0 | 5.86 | 25.4 | 175 | 149 |
| | 5 | 16.2 | 5.86 | 25.7 | 113 | |
| | 10 | 16.2 | 5.84 | 26.4 | 123 | |
| | 15 | 16.3 | 5.82 | 26.6 | 138 | |
| | 20 | 16.2 | 5.80 | 26.8 | 139 | |

Results presented above indicate that more water was removed using examples 10 and 11 as compared to example 9, which did not have any nanofiber layer. The data illustrates that nanofiber can absorb water and play as a safety role for water concentration reduction through absorption.

Water Slug Test—Group 1

The diesel fuel described in previous section 5.1 for Group 1 is the same used in water slug test for Group 1 samples.

| | Test Time (sec) | LPM | Delta P (PSI) | PPM H2O Downstream |
|---|---|---|---|---|
| Baseline B | 0 | 16 | 6.23 | Not Recorded |
| | 3 | <5 | 50+ | Not Recorded |
| Example 1 | 0 | 16.5 | 4.68 | 128 |
| | 4 | <5 | 50+ | 2231 |
| Example 2 | 0 | 16.5 | 2.55 | 153 |
| | 8 | <8 | 50+ | 1276 |

Group 2

Here again, the diesel fuel described in section 5.1 for Group 2 is used during water slug tests for Group 2 samples.

|  | Test Time (sec) | LPM | Delta P (PSI) | PPM H2O Downstream |
|---|---|---|---|---|
| Baseline B | 0 | 16 | 6 | 154 |
|  | 6 | <5 | 65+ | 7600+ |
| Example 3 | 0 | 16 | 4 | 163 |
|  | 6 | <5 | 70+ | 7538 |
| Example 4 | 0 | 16.5 | 4 | 156 |
|  | 6 | <8 | 65+ | 3149 |
| Example 5 | 0 | 15.8 | 8 | 128 |
|  | 5 | <7 | 70+ | 91 |
| Example 6 | 0 | 15.0 | 7 | 132 |
|  | 5 | <7 | 70+ | 2352 |

Drying of Fuel Below Saturation

One other aspect of performance that the design of the invention demonstrates is an ability to dry the fuel below the saturation limit for water. Donaldson Company internal testing is based on IP Draft Standard 1583 5$^{th}$ edition qualification test 4.5.1 Media Migration and Starting Differential Pressure Test. The test includes adding water to a batch of fuel until it reaches its saturation point, in this case slightly over 150 ppm total water and then recirculating the fuel through the filter for 20 minutes. The data below shows total water in the fuel decreasing from 150 ppm to 51 ppm over the 20 minute recirculation test.

Example 8

| Saturated Recirculation results | | | | |
|---|---|---|---|---|
| Test Time (min) | LPM Flow | Delta P (PSI) | Fluid Temp (° C.) | PPM H2O Downstream |
| 0 | 16.2 | 4.57 | 25.9 | 150 |
| 5 | 16.5 | 4.61 | 27.1 | 71 |
| 10 | 16.6 | 4.5 | 28.0 | 58 |
| 15 | 16.6 | 4.39 | 29.1 | 58 |
| 20 | 16.6 | 4.32 | 29.8 | 51 |

SAP Particle Migration

According to the test protocol described in the experimental section, membranes were stained and tested for migrated SAP particles using an optical microscope. The table presented illustrates the significant difference in terms of SAP particle counts between a filter composed of nanofiber enhanced superabsorbent nonwoven and the version that does not have nanofibers. It is clear that nanofibers played a key role in terms of stopping the migration of SAP particles downstream of the filter. It is also straightforward that one can incorporate nanofibers as particle entrapping nets for not only on the downstream of the superabsorbent nonwoven but also on the upstream as well to improve the security of the filters free of any particle migration which otherwise can take place.

|  | Sample ID | | | | | | | | | | | | | | | | | | | | |
|---|---|---|---|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 16 | 17 | 18 | 19 | 20 | Total |
| w/out nano fibers @ test start | 6 | 3 | 6 | 4 | 7 | 2 | 4 | 2 | 7 | 5 | 3 | 7 | 14 | 5 | 3 | 8 | 6 | 9 | 6 | 2 | 109 |
| w/out nano fibers @ test end | 0 | 0 | 0 | 0 | 0 | 0 | 0 | 0 | 0 | 0 | 0 | 0 | 0 | 0 | 0 | 0 | 0 | 0 | 0 | 0 | 0 |
| w/ nano fibers @ test start | 0 | 0 | 0 | 0 | 0 | 0 | 0 | 0 | 0 | 0 | 0 | 0 | 0 | 0 | 0 | 0 | 0 | 0 | 0 | 0 | 0 |
| w/ nano fibers @ test end | 0 | 0 | 0 | 0 | 0 | 0 | 0 | 0 | 0 | 0 | 0 | 0 | 0 | 0 | 0 | 0 | 0 | 0 | 0 | 0 | 0 |

The function of the structure of the invention is to work as a valve or fuse and shut off flow in the presence of free water in fuel. A critical improvement is demonstrated in the rapid pressure drop increase stopping fuel loading in the event of a water contamination situation.

Figure 6:
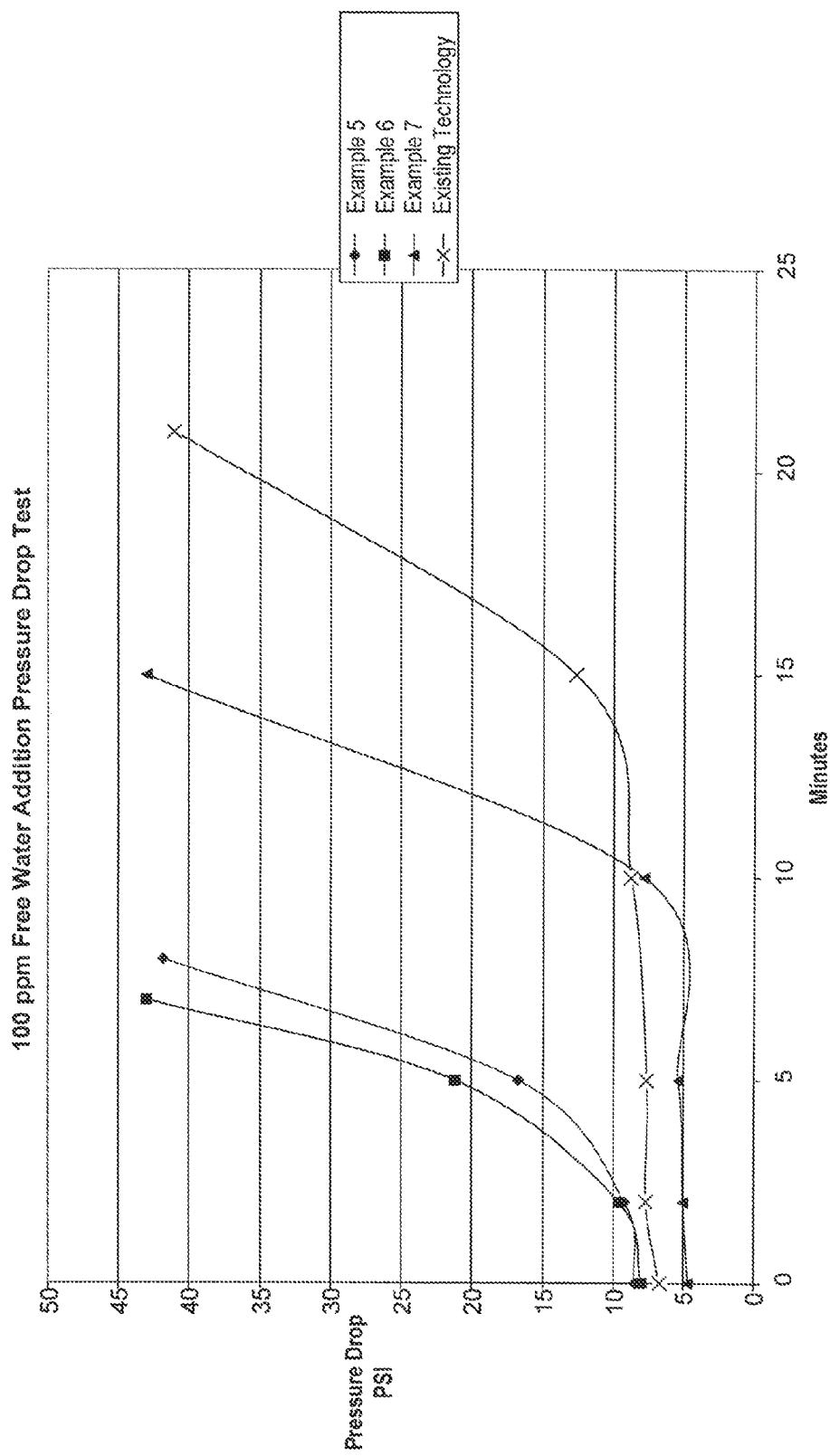
FIGS. 6 to 8 illustrate the fuse, valve or shut off and pressure drop characteristics of the constructions of the invention
Figure 8:
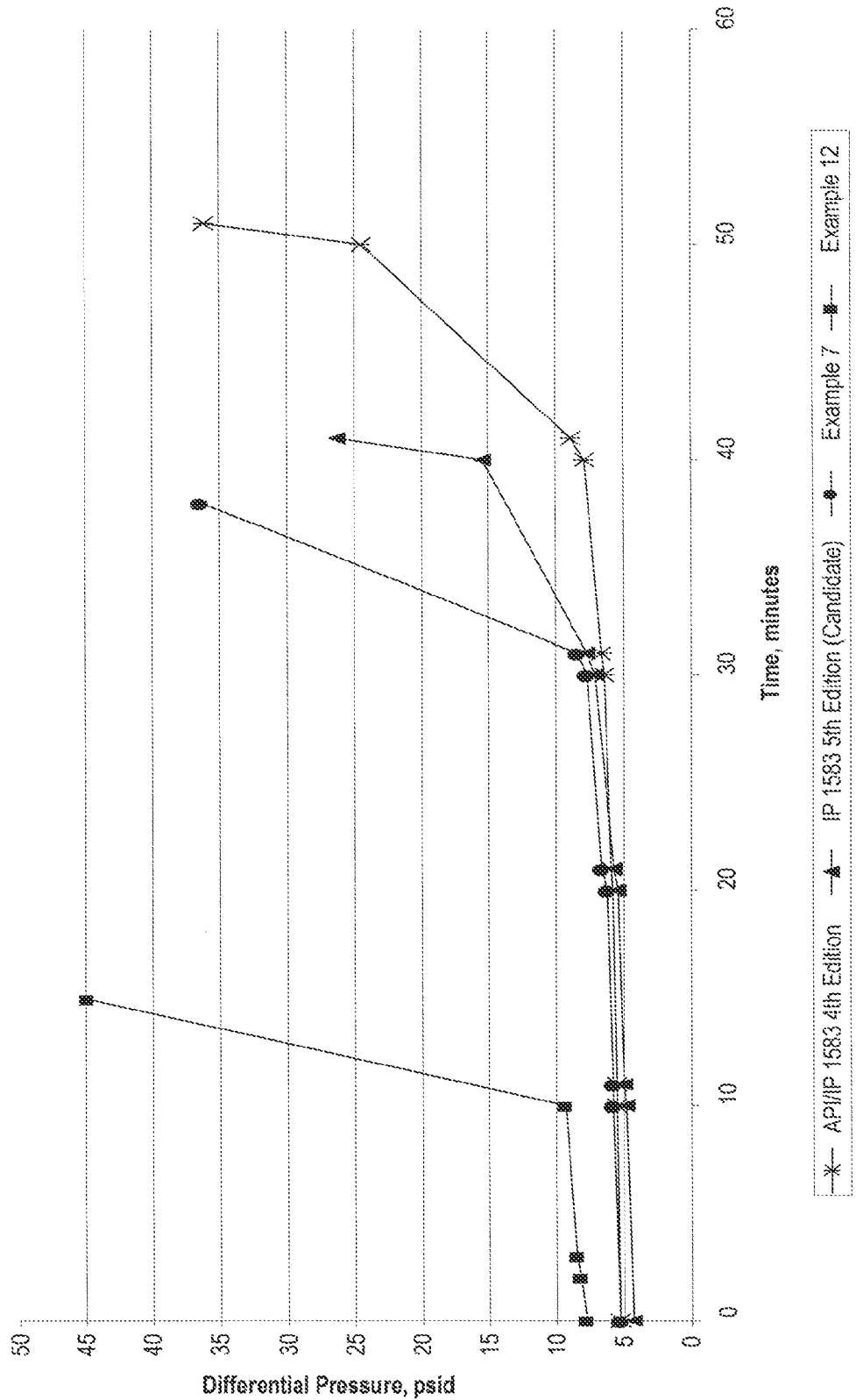

FIGS. 6-8 show a quicker shutoff and improved pressures for elements of the invention (Example 12) versus current design competitor elements on diesel fuel with 100 ppm of free water at 5 gpm with an element ⅙$^{th}$ the size of a standard monitor. The internal test is a modification of Qualification Test 4.5.2, 50 ppm Water Test, Full Rated Flow, from the IP Draft Standard 1583 5$^{th}$ edition IP06/026. The testing uses diesel fuel instead of Jet A fuel and 100 ppm water. A diagram of the test rig is a Figure5, and the test procedure is described.

DEFINITIONS AND ABBREVIATIONS

IFT: Interfacial Tension surface tension between two immiscible liquids.

Surfactancy: The amount and type of surfactant(s) in a liquid that cause apparent liquid property change such as decreased surface tension and IFT, increased conductivity, increased solubility and so on.

Surface tension: It is an effect within the surface layer of a liquid that causes that layer to behave as an elastic sheet.

MSEP Rating: Microseparometer rating is an indicator of fuel surfactancy obtained by measuring the fuel turbidity after the formed water-in-fuel emulsion is filtered through a standard coalescence material.

Emulsion: Emulsion is a mixture of two immiscible substances. One substance (the dispersed phase) is dispersed in the other (the continuous phase):

ULS: Ultra Low Sulfur
Delta P: Pressure drop
LPM: Liters per minute
gpm: Gallons per minute
ppm: parts per million
psi: pounds per square inch The above specification, examples and data provide a complete description of the manufacture and use of the composition of the invention. Since many embodiments of the invention can be made without departing from the spirit and scope of the invention, the invention resides in the claims hereinafter appended.

We claim:

1. A filter element comprising a filter media, the media comprising a first and second opposite flow faces and a plurality of flutes, the media comprising;
   (i) each of said flutes having a first open end portion adjacent to said first flow face and a second open end portion adjacent to said second flow face;
   (ii) said media comprising a non-woven filter substrate and formed on the substrate a substantially continuous nanofiber layer having a fiber diameter of about 0.001 to 0.5 micron and a super absorbent wherein the super absorbent comprises 0.1 to 50 vol % of the layer, the layer having a thickness of about 0.0001 to 1 cm and the super absorbent comprises about 0.001 to 10 kg per square meter of the layer;
wherein selected ones of said flutes being open at said first end portion and closed at said second end portion; and selected ones of said flutes being closed at said first end portion and open at said second end portion provides a fluid path through the fluted layer.

2. The element of claim 1, wherein the super absorbent comprises a particle dispersed in the nanofiber layer, the media having a thickness of 0.5 to 500 microns; wherein the element comprises a flow-by or flow through path such that a fluid can flow in a path parallel to the substrate.

3. The element of claim 1, wherein the element comprises about 5 to 95 wt % nanofiber and about 95 to 5 wt % super absorbent fiber.

4. The element of claim 2, wherein the element comprises about 30 to 75 wt % fiber and about 70 to 25 wt % super absorbent particle.

5. The element of claim 2, wherein the super absorbent particle has a major dimension of about 0.1 to 500 microns.

6. The element of claim 1, wherein the element has a Frazier permeability of about 1 to about 50 meters-minutes$^{-1}$ and an efficiency of about 40 to about 99.9999% under ASTM 1215-89 using monodispersed 0.78 micron polystyrene latex particulate at 6.1 m-min$^{-1}$ or 20 ft-min$^{-1}$.

7. The element of claim 2, wherein the element comprises one or more nanofiber webs having a thickness of at least about 0.5 micron, at least one layer comprises super absorbent particle or fabric and at least one other layer comprises an active particle.

8. The element of claim 2, wherein the particle is an absorbent.

9. The element of claim 2, wherein the particle is a combination of an absorbent and an adsorbent particulate.

10. The element of claim 2, wherein the particle is a combination of an absorbant and a reactive particulate.

11. The element of claim 2, wherein the web has a gradient in the distribution of the super absorbent particle or fiber.

12. The element of claim 1, wherein the web has a gradient in the distribution of the fiber.

13. A filter element comprising a filtration substrate comprising a substantially continuous nanofiber layer having a fiber with a diameter of about 0.001 to 0.5 micron, the layer having a thickness of about 0.1 to 100 microns and a pore size of about 0.01 to 10 microns, the substrate comprising a super absorbent particle or fiber, the super absorbent particulate or fiber comprising about 0.1 to 50 vol % of the web, the super absorbent fiber or particulate comprising about 0.001 to 10 kg per square meter of the membrane.

14. The element of claim 13, wherein the element comprises a flow-by direction such that the fluid can flow in a path parallel to the membrane with no substantial filtration path through the membrane.

15. The element of claim 13, wherein the element comprises a flow-through direction such that the fluid can flow in a path across the membrane with a substantial filtration path through the membrane.

16. The element of claim 13, wherein the element comprises about 5 to 95 wt % nanofiber layer mass and about 95 to 5 wt % super absorbent fiber or particle, based on the element, and the element comprising 1 to 100 g-m$^{-2}$ of particle.

17. The element of claim 13, wherein the element comprises about 30 to 75 wt % of nanofiber layer mass and about 70 to 25 wt % super absorbent fiber or particle based on the element, and the element comprising 1 to 1000 g-m$^{-2}$ of particle.

18. The element of claim 13, wherein the super absorbent particle has a major dimension of less than 500 microns.

19. The element of claim 13, wherein the super absorbent particle is combined with an absorbent particle, and adsorbent particle, a reactive particle or mixtures thereof.

20. The element of claim 13, wherein the particle has a major dimension of about 5 to 200 microns.

21. The element of claim 13, wherein the element comprises two or more layers, one layer comprising the web and a second layer, the second layer being substantially free of particle superabsorbent.

22. The element of claim 21, wherein the second layer comprises a filter substrate.

23. A web comprising a layered composite, the layered composite comprising:
   (a) a non-woven filter layer;
   (b) a substantially continuous nanofiber layer, the nanofiber having a fiber diameter of about 0.01 to 0.5 micron;
   (c) a superabsorbent wherein the superabsorbent comprises a layer having a thickness of greater than 100 microns;
   (d) a substantially continuous nanofiber layer, the nanofiber having a fiber diameter of about 0.01 to 5 micron; and
   (e) a non-woven filter layer.

24. The web of claim 23 wherein at least one of the non-woven filter layers comprise a layer comprising a bicomponent fiber having a basis weight of about 10 to 100 g-m$^{-2}$ and a thickness of about 2 to 50 microns.

25. The web of claim 23 wherein the nanofiber layer comprises an efficiency of greater than about 95% with a 0.3 micron test particle at 10.5 ft-min$^{-1}$.

\* \* \* \* \*